US012340438B2

(12) United States Patent
Tanaka

(10) Patent No.: US 12,340,438 B2
(45) Date of Patent: Jun. 24, 2025

(54) INFORMATION PROCESSING DEVICE AND INFORMATION PROCESSING METHOD

(71) Applicant: SONY GROUP CORPORATION, Tokyo (JP)

(72) Inventor: Yu Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 140 days.

(21) Appl. No.: 18/042,547

(22) PCT Filed: Aug. 23, 2021

(86) PCT No.: PCT/JP2021/030725
§ 371 (c)(1),
(2) Date: Feb. 22, 2023

(87) PCT Pub. No.: WO2022/050096
PCT Pub. Date: Mar. 10, 2022

(65) Prior Publication Data
US 2023/0351643 A1 Nov. 2, 2023

(30) Foreign Application Priority Data
Sep. 2, 2020 (JP) ................. 2020-147337

(51) Int. Cl.
G06T 11/00 (2006.01)
G06V 10/764 (2022.01)
(Continued)

(52) U.S. Cl.
CPC ............ *G06T 11/00* (2013.01); *G06V 10/764* (2022.01); *G06V 10/7715* (2022.01); *G06V 10/82* (2022.01); *G06V 40/10* (2022.01)

(58) Field of Classification Search
None
See application file for complete search history.

(56) References Cited

U.S. PATENT DOCUMENTS

2012/0299912 A1* 11/2012 Kapur .................... G06Q 30/02
345/419
2015/0022444 A1* 1/2015 Ooi ........................ G06V 20/20
345/156
(Continued)

FOREIGN PATENT DOCUMENTS

JP 2019-079439 A 5/2019
JP 2019-220104 A 12/2019
(Continued)

OTHER PUBLICATIONS

International Search Report and Written Opinion of PCT Application No. PCT/JP2021/030725, issued on Nov. 9, 2021, 10 pages of ISRWO.

Primary Examiner — Daniel F Hajnik
Assistant Examiner — Jed-Justin Imperial
(74) Attorney, Agent, or Firm — CHIP LAW GROUP

(57) ABSTRACT

There is provided an information processing device including a data acquisition unit that acquires sensing data of a real object, a parameter acquisition unit that acquires a predetermined parameter, and an object generation unit that extracts a feature amount from the sensing data and generates a virtual object based on the feature amount, in which the object generation unit adjusts the virtual object according to the predetermined parameter.

19 Claims, 21 Drawing Sheets

(51) Int. Cl.
   *G06V 10/77* (2022.01)
   *G06V 10/82* (2022.01)
   *G06V 40/10* (2022.01)

(56) References Cited

U.S. PATENT DOCUMENTS

2015/0324103 A1* 11/2015 Tepmongkol ....... G06F 3/04847
                                                    715/757
2017/0287060 A1* 10/2017 Choi ...................... G06T 15/04

FOREIGN PATENT DOCUMENTS

| JP | 2020-017068 | A  | 1/2020 |
| JP | 2020-027598 | A  | 2/2020 |
| JP | 6656572     | B1 | 3/2020 |
| JP | 2020-119156 | A  | 8/2020 |

* cited by examiner

FIG.24

Bag_1

| LOCATION | EARLY MORNING (5:00 TO 8:00) | MORNING (8:00 TO 11:00) | NOON (11:00 TO 14:00) | AFTERNOON (14:00 TO 18:00) | EVENING/ NIGHT (18:00 TO 22:00) | MIDNIGHT (22:00 TO 5:00) |
|---|---|---|---|---|---|---|
| HOME | 0 | 0 | 0 | 0 | 0 | 0 |
| OUTDOOR | 0 | 2 | 0 | 2 | 0 | 0 |
| OFFICE | 0 | 20 | 20 | 20 | 0 | 0 |
| CAFE | 0 | 0 | 2 | 0 | 0 | 0 |
| ... | ... | ... | ... | ... | ... | ... |

Bag_2

| LOCATION | EARLY MORNING (5:00 TO 8:00) | MORNING (8:00 TO 11:00) | NOON (11:00 TO 14:00) | AFTERNOON (14:00 TO 18:00) | EVENING/ NIGHT (18:00 TO 22:00) | MIDNIGHT (22:00 TO 5:00) |
|---|---|---|---|---|---|---|
| HOME | 0 | 0 | 0 | 0 | 0 | 0 |
| OUTDOOR | 0 | 5 | 0 | 5 | 0 | 0 |
| OFFICE | 0 | 0 | 0 | 0 | 0 | 0 |
| CAFE | 0 | 0 | 5 | 0 | 0 | 0 |
| ... | ... | ... | ... | ... | ... | ... |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/030725 filed on Aug. 23, 2021, which claims priority benefit of Japanese Patent Application No. JP 2020-147337 filed in the Japan Patent Office on Sep. 2, 2020. Each of the above-referenced applications is hereby incorporated herein by reference in its entirety.

FIELD

The present disclosure relates to an information processing device, an information processing method, and a program.

BACKGROUND

Recently, there are increasing opportunities of performing communication and business online. For example, examples of the business online include a technology of performing sales of a second-hand product between a seller and a purchaser using an e-commerce platform without using a physical store.

CITATION LIST

Patent Literature

Patent Literature 1: JP 2020-17068 A

SUMMARY

Technical Problem

Unlike real communication performed in a physical store, an office, or the like, online communication as described above has a problem unique to online communication because of limited amount of information that can be transmitted. Therefore, in order to solve the above problem, there is a technology attracting attention, which is a technology of performing communication in a virtual space via an avatar or the like that is a virtual self of a user.

However, there has been few discussion about a technique capable of putting a further added value to an avatar or the like used in communication in the virtual space.

The present disclosure has been made in view of the above-described situation, and proposes an information processing device, an information processing method, and a program capable of putting a new added value to a virtual object such as an avatar used for communication on a virtual space.

Solution to Problem

According to the present disclosure, there is provided an information processing device including: a data acquisition unit that acquires sensing data of a real object; a parameter acquisition unit that acquires a predetermined parameter; and an object generation unit that extracts a feature amount from the sensing data and generates a virtual object based on the feature amount, in which the object generation unit adjusts the virtual object according to the predetermined parameter.

Furthermore, according to the present disclosure, there is provided an information processing method, by an information processing device, including: acquiring sensing data of a real object, acquiring a predetermined parameter, extracting a feature amount from the sensing data, and generating a virtual object based on the feature amount, in which the virtual object is adjusted in accordance with the predetermined parameter at the time of generation of the virtual object.

Furthermore, according to the present disclosure, there is provided a program causing a computer to implement: a function of acquiring sensing data of a real object; a function of acquiring a predetermined parameter; and a function of extracting a feature amount from the sensing data and generating a virtual object based on the feature amount, in which the virtual object is adjusted according to the predetermined parameter at the time of generation of the virtual object.

BRIEF DESCRIPTION OF DRAWINGS

FIG. 24 is a diagram (part 2) illustrating a configuration example of a database stored in a storage unit of FIG. 12.

DESCRIPTION OF EMBODIMENTS

Figure 1:
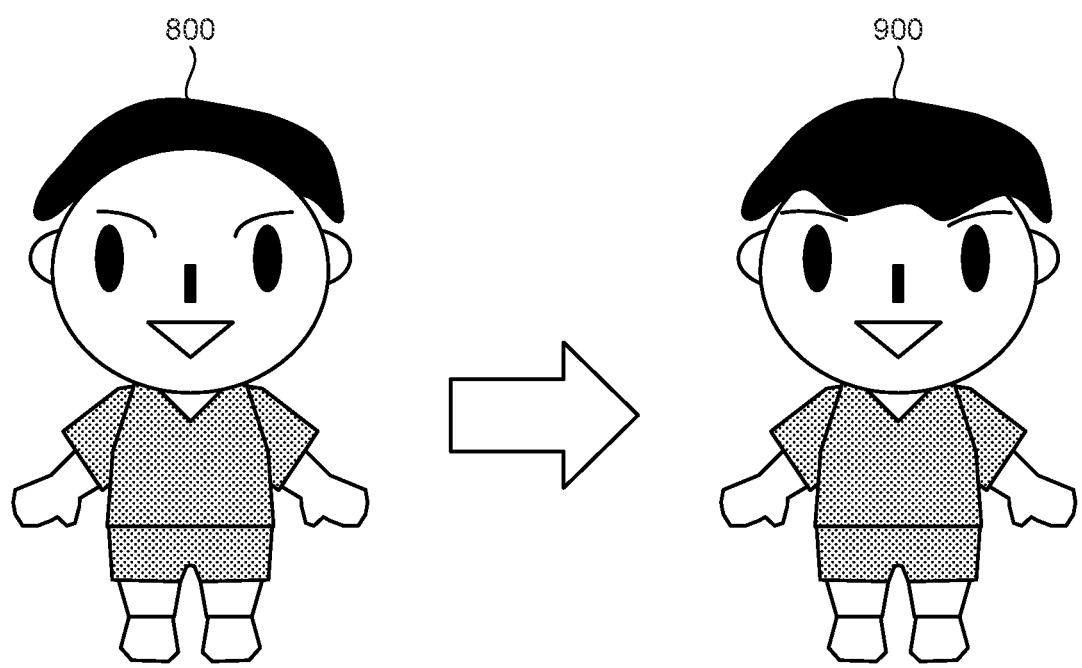
FIG. 1 is a diagram illustrating an example of generation of an avatar according to an embodiment of the present disclosure.

Preferred embodiments of the present disclosure will be described in detail hereinbelow with reference to the accompanying drawings. Note that redundant descriptions will be omitted from the present specification and the drawings by assigning the same reference signs to components having substantially the same functional configuration. Furthermore, in the present specification and the drawings, similar components of different embodiments may be distinguished by adding different alphabets after the same reference numerals. However, when there is no need to particularly distinguish similar components from each other, only the same reference numeral is assigned.

Note that, in the present specification, an "icon" represents a figure expressing a target article or the like by means of such as an illustration with a trace of original shape of the target article, etc. Furthermore, in the present specification, an "avatar" represents a character image that functions as a virtual self of the user or an identification figure of the user in the virtual space.

Note that the description will be provided in the following order.

1. Background of creation of embodiment according to present disclosure
2. Embodiment
2.1 Outline of information processing system 10
2.2 Detailed configuration of user terminal 100
2.3 Detailed configuration of server 300
2.4 Detailed configuration of object generation unit 340
2.5 Information processing method
3. Exemplary embodiments
3.1 First exemplary embodiment
3.2 Second exemplary embodiment
3.3 Third exemplary embodiment
4. Summary
5. Hardware configuration
6. Supplementary notes

1. BACKGROUND OF CREATION OF EMBODIMENT OF PRESENT DISCLOSURE

Figure 2:
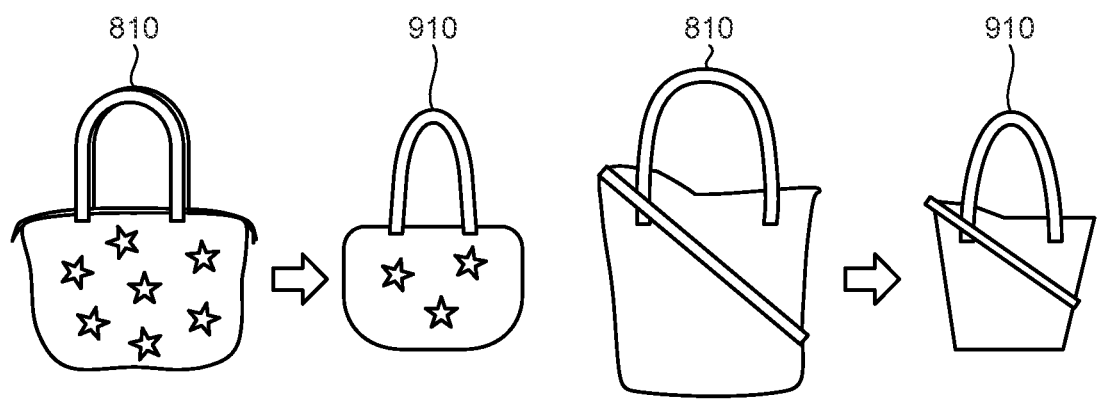
FIG. 2 is a diagram illustrating an example of generation of an icon according to the embodiment of the present disclosure.

First, before describing the details of the embodiment of the present disclosure, the background leading to the creation of the embodiment of the present disclosure by the present inventors will be described with reference to FIGS. 1 and 2. FIG. 1 is a diagram illustrating an example of generation of an avatar according to an embodiment of the present disclosure, and FIG. 2 is a diagram illustrating an example of generation of an icon according to an embodiment of the present disclosure.

In recent years, opportunities to use online communication means are increasing due to the spread of the Corona-Virus Disease-2019 (COVID-19). Examples of such online communication means include a video meeting room system and a chat tool. However, they merely establish communication by sharing information such as uttered voice, a video of a face, and text alone, and thus, are practically incapable of sharing some communication elements, which are difficult to be appropriately formatted for information exchange, such as "mood and atmosphere" or "reaction" of the other party. That is, compared to real communication, online communication has a problem unique to online communication because of the limited amount of information that can be transmitted.

Therefore, in order to solve the above-described problem, there is a means of attracting increased attention, for establishing communication including richer (large amount of) information even online, specifically, a means of establishing communication in a virtual space via a tool such as an avatar, which is a virtual self of the user, for example. By using intricate motions of avatars, it is possible to transmit information such as emotions that cannot be expressed by words or the like to the other party. Moreover, by putting an avatar of a participating user in a shared virtual space, the participating users can share "a feeling of currently present here" with each other. In this manner, by using a means such as an avatar, it is possible to make up for shortcomings of conventional online communications, leading to establishment of richer communication. More specifically, the user can prepare an avatar to be a virtual self of the user by drawing an illustration by the user or selecting and combining parts (such as face, hairstyle, eyes, mouth) prepared in advance. Furthermore, the user can freely move the avatar in the virtual space by their operation, and can freely move the avatar based on an image captured by a camera that captures self-images or sensing data of a motion sensor worn by the user.

In view of such a situation, the present inventors have had visions to enable communications via a tool such as an avatar to be conducted with more realistic feeling by enforcing the connection between a virtual world (virtual space) and a real world. This has led the present inventors to a concept of a technology capable of automatically generating an avatar very similar to the user themselves or an icon very similar to an article actually possessed by the user themselves and using the generated icon in the virtual space. Specifically, according to the technology conceived by the present inventors, it is possible to automatically generate an avatar 900 very similar to a user 800 based on an image of the user 800 as illustrated in FIG. 1, or automatically generate an icon 910 very similar to an article 810 based on an image of the article 810 as illustrated in FIG. 2.

Furthermore, instead of simply generating the avatar 900 or the icon 910 (virtual object) very similar to the user 800 or the article 810 (real object) based on the image, the present inventors have created an original technology of generating the avatar 900 or the icon 910 with a modified design according to information related to the user 800 or the article 810 (such as position information and biometric information of the user 800, the number of products 810 in sales, quality, and the like) (that is, parameters). According to such a technology, it is possible to generate the avatar 900 or the icon 910 with a certain characteristic more emphasized, or generate the avatar 900 or the icon 910 having a surprising or fresh design unpredictable by the user 800. That is, according to the embodiment of the present disclosure created by the present inventors, the user 800 can enjoy the avatar 900 and the icon 910 that are variously changed according to various information, making it possible to put an added value to the generated avatar 900 and the icon 910, rather than being just very close to the user 800 and the article 810. Hereinafter, details of embodiments of the present disclosure created by the present inventors will be described.

2. EMBODIMENTS

<2.1 Configuration of Information Processing System 10>

Figure 3:
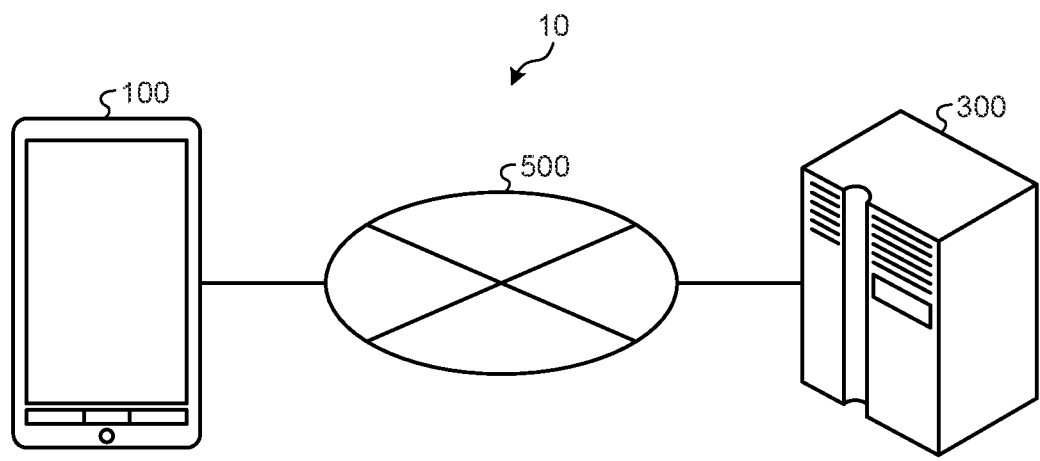
FIG. 3 is a configuration diagram of an information processing system according to the embodiment of the present disclosure.

First, a configuration example of an information processing system 10 according to an embodiment of the present disclosure will be described with reference to FIG. 3. FIG. 3 is a configuration diagram of the information processing system 10 according to the embodiment of the present disclosure.

As illustrated in FIG. 3, the information processing system 10 according to the present embodiment includes a user terminal 100 and a server 300, which are communicably connected to each other via a communication network 500. Specifically, the user terminal 100 and the server 300 are connected to the communication network 500 via a base station or the like (for example, a base station of a mobile phone, an access point of a wireless local area network (LAN), and the like) which is not illustrated. The communication method used in the communication network 500 can be implemented by any method regardless of wired or wireless. Still, it is desirable to apply a communication method capable of maintaining a stable operation. Hereinafter, an outline of each device included in the information processing system 10 according to the embodiment of the present disclosure will be described.
(User Terminal 100)

The user terminal 100 is a terminal for receiving sensing data such as an image by an operation of the user 800 and displaying a virtual object generated by the server 300 to the user 800. For example, the user terminal 70 can be devices such as a tablet, a smartphone, a mobile phone, a laptop personal computer (PC), a notebook PC, and a desktop PC, or a wearable device such as a head mounted display (HMD). The wearable device is a device that can be worn on a part of the body of the user 800. More specifically, various types of wearable devices such as an HMD type, a bracelet type, and an eyewear type can be adopted. Note that details of the user terminal 100 will be described below.
(Server 300)

The server 300 is constituted with a device such as a computer. For example, the server 300 is held by a service provider that provides a service according to the present embodiment, and provides a service to each user 800. Specifically, the server 300 provides a virtual object (avatar 900, icon 910, and the like) to each user 800. Note that details of the server 300 will be described below.

Although the information processing system 10 according to the present embodiment in FIG. 3 is illustrated as including one user terminal 100, the number is not limited to one. For example, the information processing system 10 according to the present embodiment may include a plurality of user terminals 100. Furthermore, the information processing system 10 according to the embodiment may include another communication device such as a relay device used in transmission of sensing data or a virtual object between the user terminal 100 and the server 300.

<2.2 Detailed Configuration of User Terminal 100>

Figure 4:
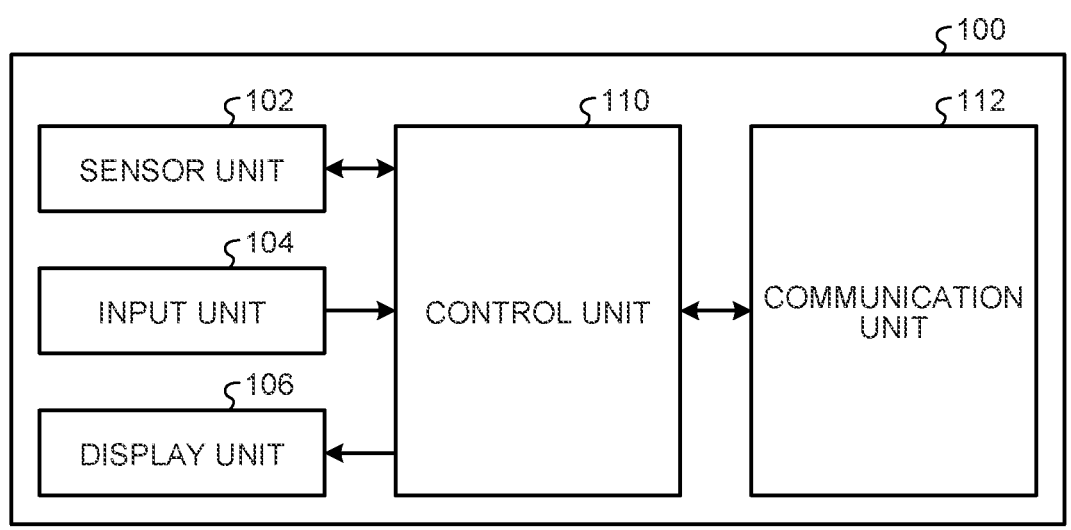
FIG. 4 is a block diagram of a user terminal according to the embodiment of the present disclosure.
Figure 11:
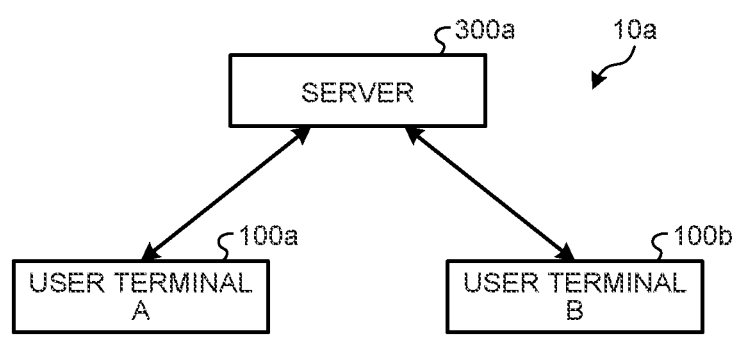
FIG. 11 is a configuration diagram of an information processing system according to the first exemplary embodiment.

Next, a configuration of the user terminal 100 according to the embodiment of the present disclosure will be described with reference to FIG. 4. FIG. 4 is a block diagram of the user terminal 100 according to the embodiment of the present disclosure. As illustrated in FIG. 11, the user terminal 100 mainly includes a sensor unit 102, an input unit 104, a display unit 106, a control unit 110, and a communication unit 112. Hereinafter, details of each functional unit of the user terminal 100 will be described.
(Sensor Unit 102)

The sensor unit 102 can be an imaging device that is provided in the user terminal 100 and captures an image or the like of the user 800 or the article 810 (real object) of the user. In addition, the sensor unit 102 can output acquired image data (sensing data) to the control unit 110 described below. The above-described imaging device is not limited to a visible light camera, and may be a depth sensor such as a time of flight (ToF) sensor that acquires depth information of a real object using reflection of infrared rays. Here, the depth information is information regarding depth, which is one of information indicating a distance from the ToF sensor to each point on a surface of the real object. By aggregating depth information of a plurality of points on the surface, the depth information can be handled as shape information regarding uneven shapes of the surface of the real object, that is, outer shape information regarding the real object.

Furthermore, the sensor unit 102 may include various sensors used for authentication such as fingerprint authentication, face authentication, iris authentication, gait authentication, and pulse authentication, and may include a motion sensor for detecting the motion of the user 800 in order to acquire parameters according to the present embodiment. For example, the motion sensor is implemented by one or a plurality of sensor devices such as an acceleration sensor, a gyro sensor, and a geomagnetic sensor, and detects a change in acceleration, angular velocity, or the like that occurs with the motion of the user 800. Furthermore, the sensor unit 102 may include a positioning sensor that detects the position of the user 800 in order to acquire the parameters according to the present embodiment. The positioning sensor can be a device such as a global navigation satellite system (GNSS) receiver, for example. In this case, the positioning sensor can generate sensing data indicating the latitude and longitude of the current location of the user 800 based on a signal from a GNSS satellite. Since the positioning sensor can detect the relative positional relationship of the user 800 based on information regarding radio frequency identification (RFID), an access point of Wi-Fi, and a radio base station, and the like, making it possible to use such a communication device as the positioning sensor. Furthermore, in order to acquire parameters according to the present embodiment, the sensor unit 102 may include a biometric information sensor that acquires biometric information of the user 800. The biometric information sensor can be various biometric information sensors such as a heart rate sensor, a pulse sensor, a blood flow sensor (including a blood pressure sensor), a respiration sensor (including a calorimeter to using a respiration amount), an electroencephalogram sensor, a skin temperature sensor, a skin conductivity sensor, a perspiration sensor, and a myoelectric sensor. Furthermore, in order to acquire the parameters according to the present embodiment, the sensor unit 102 may include an environmental information sensor that acquires environmental information such as illuminance, temperature, and humidity of the surrounding environment.

Furthermore, in the present embodiment, the sensor unit 102 may be provided as a device separate from the user terminal 100, not limited to being provided in the user terminal 100.

(Input Unit 104)

The input unit 104 can receive an input of data and a command (for example, the parameter according to the present embodiment) to the user terminal 100 and can output the received input data to the control unit 110 described below. More specifically, the input unit 104 is implemented by a touch panel, a keyboard, and the like. Furthermore, the input unit 104 may be a microphone that receives a voice input from the user 800.

(Display Unit 106)

The display unit 106 can display a virtual object or the like transmitted from the server 300 under the control of the control unit 110 described below. Specifically, the display unit 106 includes, for example, a liquid crystal display (LCD), an organic electro luminescence (EL) display, or the like. Note that, in the present embodiment, the display unit 106 may be provided so as to be fixed to the user terminal 100, or may be provided as a device separate from the user terminal 100.

(Control Unit 110)

The control unit 110 is provided in the user terminal 100 and can control each functional unit in the user terminal 100. The control unit 110 is implemented by hardware such as a central processing unit (CPU), read only memory (ROM), and random access memory (RAM), for example.

In addition, the control unit 110 may incorporate a clock mechanism (not illustrated) that grasps an accurate time, and transmit the sensing data to the server 300 in association with the time at which the sensing data has been acquired, for example.

(Communication Unit 112)

The communication unit 112 is provided in the user terminal 100, and can transmit and receive information to and from an external device such as the server 300. In other words, the communication unit 112 can be defined as a communication interface having a function of transmitting and receiving data. For example, the communication unit 112 is implemented by a communication device such as a communication antenna, a transmission/reception circuit, or a port.

In the present embodiment, the user terminal 100 is not limited to the configuration illustrated in FIG. 4, and may include a device such as a speaker, for example.

<2.3 Detailed Configuration of Server 300>

Figure 5:
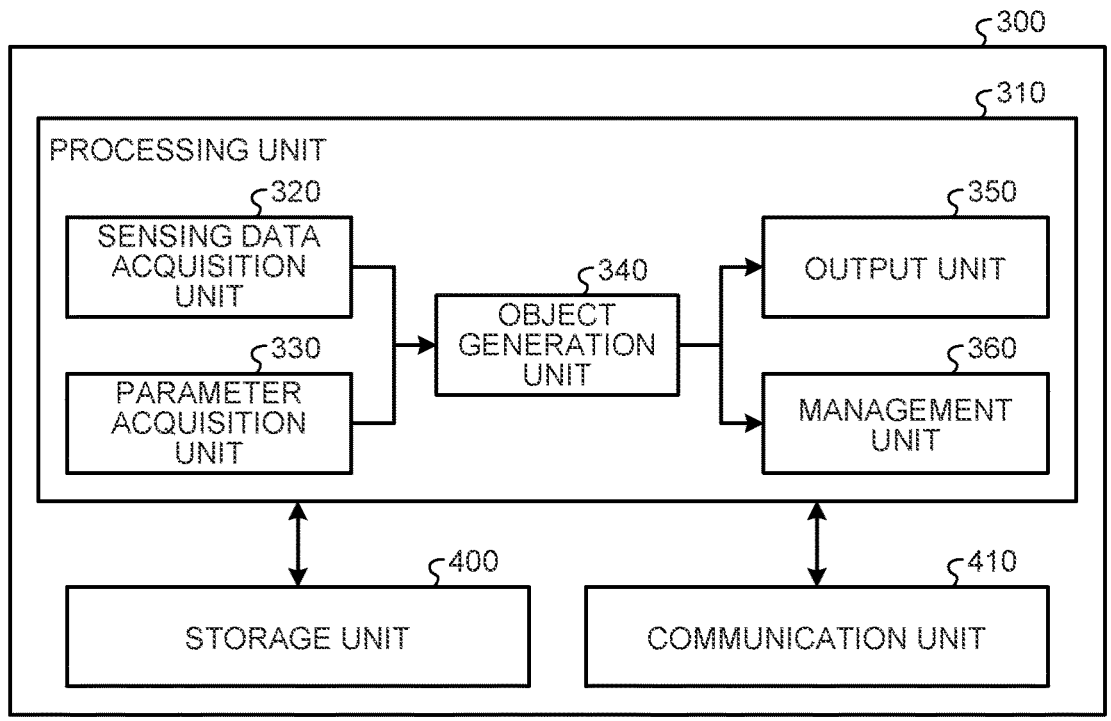
FIG. 5 is a block diagram of a server according to the embodiment of the present disclosure.

Next, a configuration of the server 300 according to the embodiment of the present disclosure will be described with reference to FIG. 5. FIG. 5 is a block diagram of the server 300 according to the embodiment of the present disclosure. As illustrated in FIG. 5, the server 300 mainly includes a processing unit 310, a storage unit 400, and a communication unit 410. Hereinafter, details of each functional unit of the server 300 will be described.

(Processing Unit 310)

The processing unit 310 is provided in the server 300 and can control individual blocks of the server 300. The processing unit 310 is implemented by hardware such as a CPU, ROM, and RAM, for example. The processing unit 310 can also function as a sensing data acquisition unit (data acquisition unit) 320, a parameter acquisition unit 330, an object generation unit 340, an output unit 350, and a management unit 360. Hereinafter, details of these functions of the processing unit 310 according to the present embodiment will be described.

The sensing data acquisition unit 320 acquires sensing data (image) of a real object (such as the user 800 and the article 810) transmitted from the user terminal 100, for example, and outputs the acquired sensing data to the object generation unit 340 described below. As described above, the sensing data in the present embodiment can be an image of the user 800 or an image of the article 810 (real object) possessed by the user 800, which are imaged by the imaging device, depth information of the real object obtained by the ToF sensor, or the like.

The parameter acquisition unit 330 acquires a parameter (predetermined parameter) transmitted from the user terminal 100, for example, and outputs the acquired parameter to the object generation unit 340 described below. In the present embodiment, the parameter can be at least one of a position parameter, a time parameter, an attribute information parameter, and an environmental parameter, regarding the real object, the virtual object, or the user 800.

More specifically, the position parameter can be position information (for example, an office, a cafe, or the like) in the real space of the user 800 and the article 810 (real object), or position information (for example, an office, a cafe, or the like in a virtual space) in the virtual space or the real space in which the virtual object is displayed. For example, the position information of the user 800 and the article 810 in the real space can be acquired by the positioning sensor or the like of the sensor unit 102 described above.

The time parameter can be time information (for example, morning or late night) in the real space of the user 800 or the article 810 (real object) or time information (for example, morning or midnight in the virtual space) in the virtual space in which the virtual object is displayed. For example, the time information of the user 800 and the article 810 in the real space can be acquired from a clock mechanism (not illustrated) built in the user terminal 100 to grasp accurate time.

Furthermore, the attribute information parameter can be attribute information such as gender, age, and body shape of the user 800, and attribute information such as quality of the article 810, a place of purchase (purchase at an event venue), purchase time, period of use, a quantity of sales, and a purchase price. For example, such attribute information can be acquired by a method such as input from the user 800.

Furthermore, the environmental parameter can be environmental information (for example, illuminance or the like) of the real space in which the user 800 and the article 810 (real object) exist, or environmental information (for example, illuminance or the like) of the virtual space or the real space in which the virtual object is displayed. For example, such environmental information can be acquired by a sensor such as an illuminometer provided in the user terminal 100.

The object generation unit 340 can extract a feature amount from sensing data such as an image and generate a virtual object (avatar 900 or icon 910) based on the feature amount, and can be implemented by a neural network such as a variational autoencoder (VAE) or a conditional variational autoencoder (VAE), for example. Then, in the present embodiment, the object generation unit 340 can adjust the virtual object according to the parameter acquired by the parameter acquisition unit 330. Furthermore, the object generation unit 340 can output the generated virtual object to the output unit 350 and the management unit 360 described below. Detailed configuration of the object generation unit 340 will be described below.

The output unit 350 can output the virtual object to an external device such as the user terminal 100. For example, the output unit 350 can cause the user terminal 100 to display a virtual object in the virtual space. Furthermore, the output unit can also cause the user terminal 100 to display the virtual object so as to be superimposed on the real space image, or display (project) the virtual object so as to be superimposed onto the real space.

The management unit 360 can store the generated icon 910 (virtual object) in the storage unit 400 described below in association with the user 800 (for example, a user 800 who possesses or rents the article 810) or the article 810 (real object) related to the sensing data used for generating the icon 910. Furthermore, the management unit 360 may store the generated icon 910 in the storage unit 400 to be described below in association with the avatar 900 (virtual object) of the user 800.

(Storage Unit 400)

The storage unit 400 is provided in the server 300, and stores programs, information, and the like for the above-described processing unit 310 to execute various types of processing, and information (virtual object) obtained by the processing. The storage unit 400 is implemented by a magnetic recording medium such as a hard disk (HD), or nonvolatile memory such as flash memory, for example.

(Communication Unit 410)

The communication unit 410 is provided in the server 300 and can transmit and receive information to and from an external device such as the user terminal 100. That the communication unit 410 is implemented by a communication device such as a communication antenna, a transmission/reception circuit, or a port.

In the present embodiment, the server 300 is not limited to the configuration illustrated in FIG. 5.

<2.4 Detailed Configuration of Object Generation Unit 340>

Figure 6:
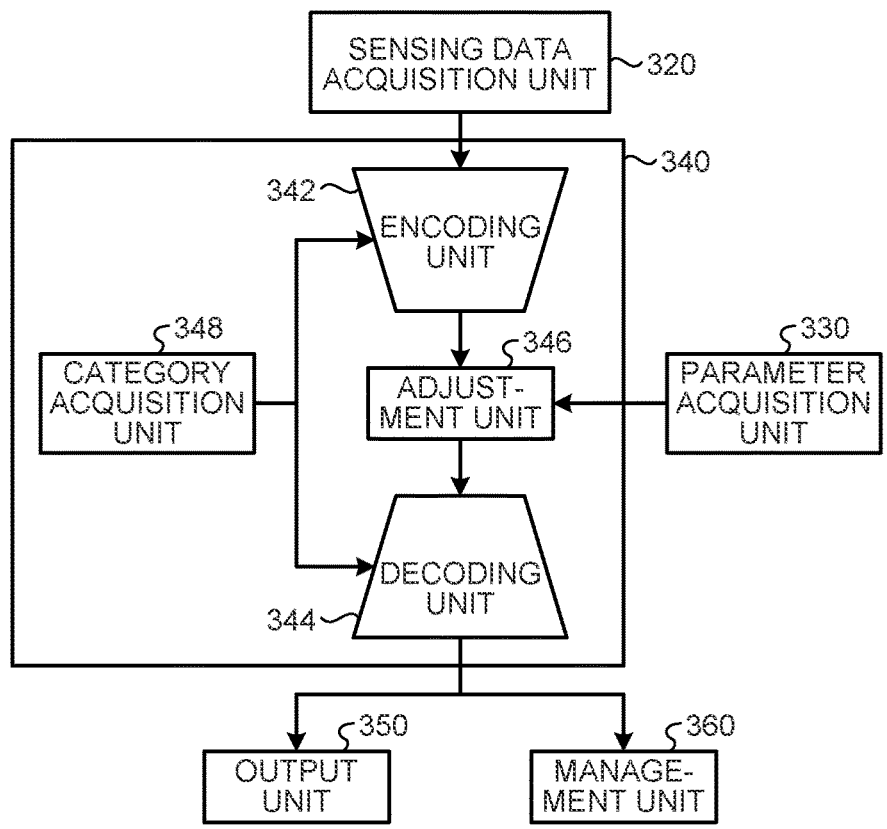
FIG. 6 is a block diagram of an object generation unit in FIG. 5.
Figure 7:
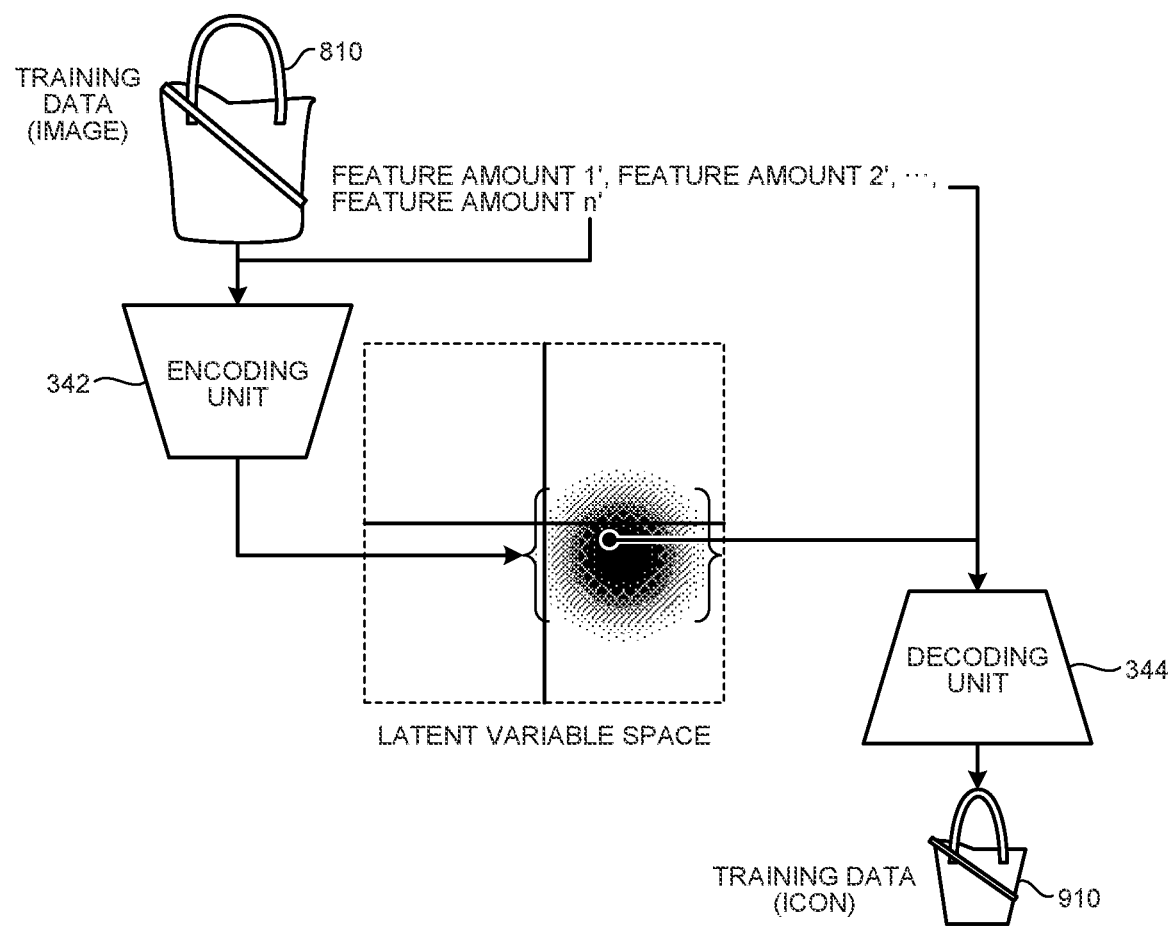
FIG. 7 is a diagram (part 1) illustrating a virtual object generation method according to the embodiment of the present disclosure.
Figure 8:
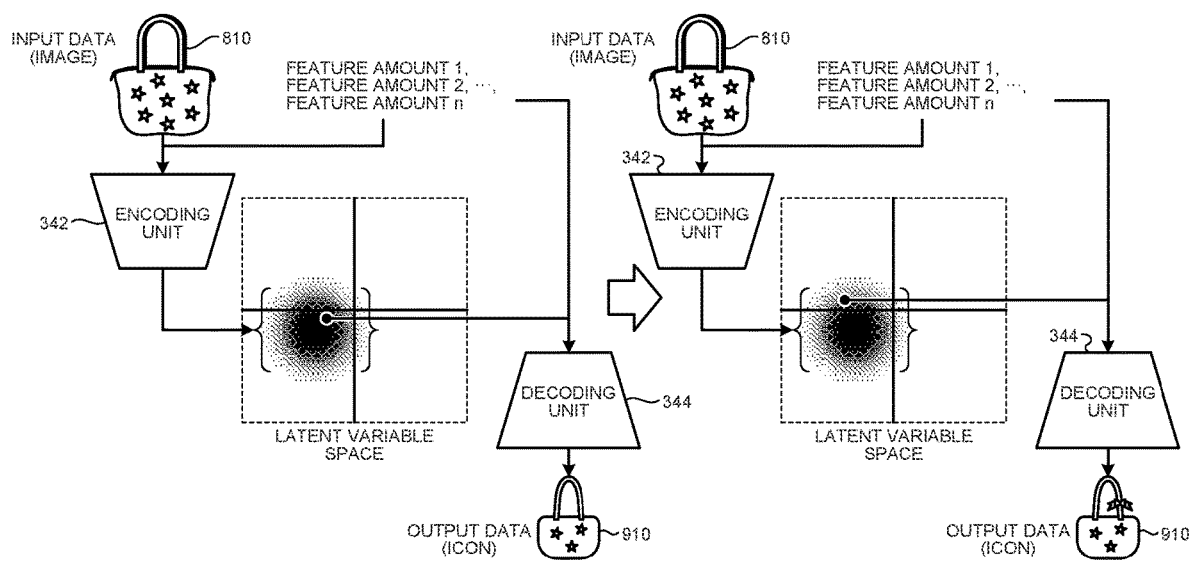
FIG. 8 is a diagram (part 2) illustrating a virtual object generation method according to the embodiment of the present disclosure.

Next, a configuration example of the object generation unit 340 according to the embodiment of the present disclosure will be described with reference to FIGS. 6 to 8. FIG. 6 is a block diagram of an object generation unit of FIG. 5. FIGS. 7 and 8 are diagrams illustrating a method of generating a virtual object according to the embodiment of the present disclosure.

In the present embodiment, as described above, the object generation unit 340 can be implemented by a neural network such as VAE or conditional VAE, for example. Accordingly, the object generation unit 340 will be described here as a conditional VAE.

The auto encoder is, for example, a neural network capable of extracting a feature amount of input data (an image in the present embodiment), convolving the extracted feature amount into a low-dimensional latent variable, and restoring original input data by the latent variable. Note that the auto encoder is assumed to have been trained by machine learning in advance so that output data restored by the auto encoder becomes closer to input data (that is, so as to reduce the difference between the input data and the output data). Furthermore, since the auto encoder can obtain a dimensionally reduced latent variable capable of restoring the original data, the auto encoder is considered to be able to extract only feature amounts important for restoring the original data.

Furthermore, in the VAE, a latent variable is treated as a variable that follows a predetermined probability distribution (for example, normal distribution and Bernoulli distribution). This makes it possible to handle the latent variable as a variable (distribution) determined by a limited number of variables, leading to achievement of generation of data that is different from the original data and very similar to the original data. Furthermore, a constraint given, in VAE, to the latent variable as a variable that follows a predetermined probability distribution will facilitate adjusting of the latent variable so as to obtain output data in which a predetermined feature is more emphasized, for example.

In addition, in the conditional VAE, it is possible to obtain output data closer to a target data by adding conditions (in the present embodiment, a category of the article 810). For example, when the conditional VAE is trained to learn images of a "dog" and a "cat", the condition of the "dog" is applied to the image of the "dog" while the condition of the "cat" is applied to the image of the "cat", with the condition of the "dog" or the "cat" applied when the conditional VAE is caused to output an image. In this manner, output data more suitable for the given conditions can be obtained.

Specifically, as illustrated in FIG. 6, the object generation unit 340 mainly includes an encoding unit 342, a decoding unit 344, an adjustment unit 346, and a category acquisition unit 348. Hereinafter, details of individual functional units of the object generation unit 340 will be described.

(Encoding Unit 342)

The encoding unit 342 can extract a feature amount from sensing data (for example, an image) of a real object (user 800, article 810) under a condition of a category output from a category acquisition unit 348 to be described below, and convolve the feature amount into a latent variable having a predetermined dimension. Then, the encoding unit 342 can output the obtained latent variable to the adjustment unit 346.

(Decoding Unit 344)

Under the condition of the category output from the category acquisition unit 348 described below, the decoding unit 344 can generate a virtual object (avatar 900, icon 910) based on the latent variable adjusted by the adjustment unit 346 described below.

(Adjustment Unit 346)

The adjustment unit 346 can adjust the latent variable based on the parameter. Specifically, the adjustment unit 346 changes the latent variable by a change amount determined based on the parameter, in other words, acquires a new latent variable separated from the original latent variable by the amount determined based on the parameter. Furthermore, the adjustment unit 346 outputs the adjusted latent variable to the decoding unit 344.

(Category Acquisition Unit 348)

The category acquisition unit 348 can acquire a category (bag, shirt, etc.) of the real object (article 810), and inputs the acquired category as a condition to the encoding unit 342 and the decoding unit 344. For example, the category may be acquired by an input from the user 800, or may be estimated from the feature amount obtained by analyzing an image of the real object.

Specifically, for example, the category acquisition unit 348 can acquire the category of the real object by using a deep neural network (DNN) or the like trained in advance using an image (training data) of the real object labeled with the category. More specifically, for example, by extracting a feature amount and its distribution from an image of the real object and searching for a category similar to the extracted feature amount, the category acquisition unit 348 can acquire the category of the real object.

The operation of the object generation unit 340 will be described in more detail with reference to FIG. 7. As illustrated in FIG. 7, the encoding unit 342 and the decoding unit 344 is trained by machine learning in advance using images (training data) of a plurality of other real objects in the same category (bag in FIG. 7) as the category to which the real object (article 810 or the like) belongs, a plurality of feature amounts (for example, shape, decoration, design, pattern, and the like) (training data) of the real object, and other virtual objects (icon 910 or the like prepared in advance) (training data) corresponding to the plurality of other real objects. In this manner, it is possible to obtain a latent variable generation model indicating the relationship between the image of the real object of the predetermined category (bag) and the virtual object corresponding to the real object.

Now, a case where of inputting an image of a real object (input data) to the encoding unit 342 and generating a virtual object (output data) by the decoding unit 344 without passing through the adjustment unit 346 is illustrated on the left side of FIG. 8. In the present embodiment, as illustrated on the right side of FIG. 8, instead of generating a virtual object using the latent variable obtained by the encoding unit 342, the adjustment unit 346 adjusts (shifts the position of) the latent variable obtained by the encoding unit 342 based on the parameter so as to generate a virtual object using the adjusted latent variable. With this configuration, it is possible, in the present embodiment, to obtain a virtual object or the like in which certain features are emphasized based on various parameters, instead of a virtual object simply similar to a real object. As a result, according to the present embodiment, virtual objects of various variations can be obtained, and an added value can be given to the generated virtual object.

<2.5 Information Processing Method>

Figure 9:
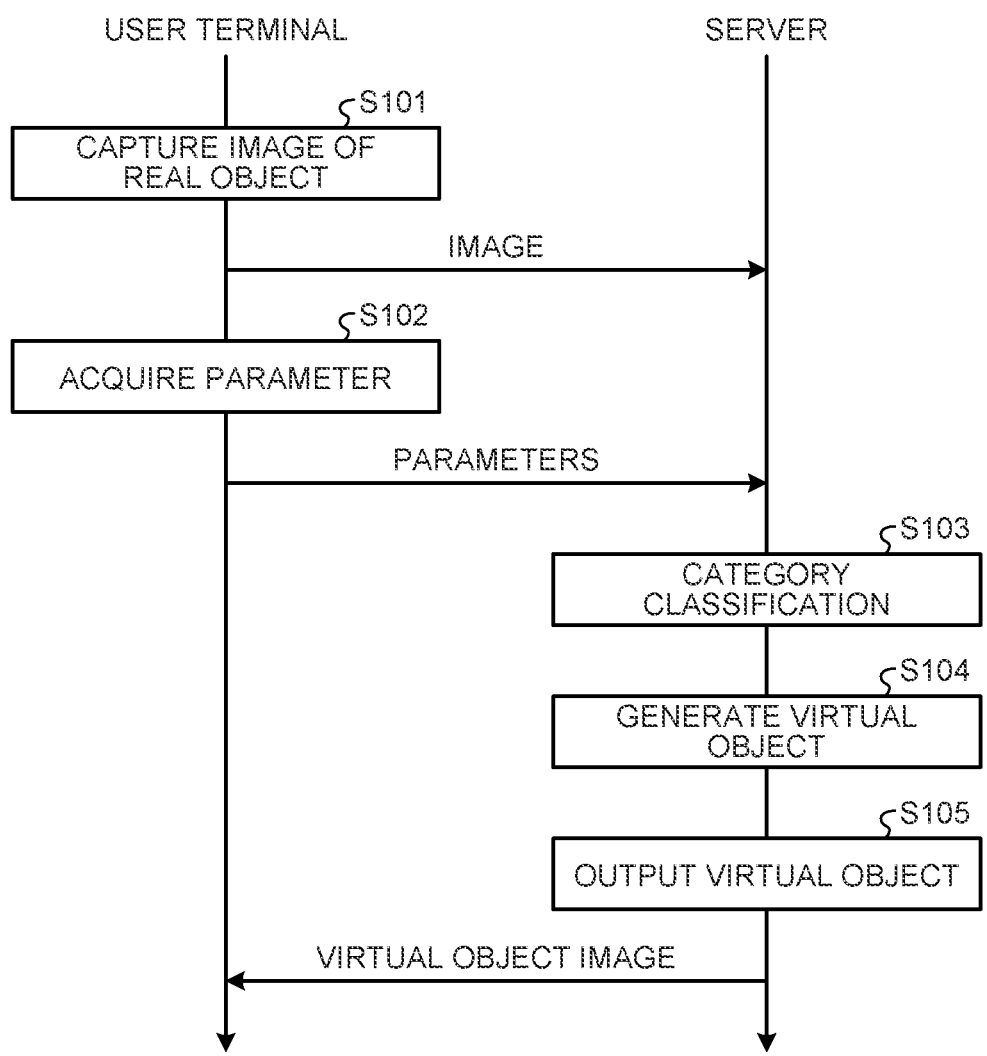
FIG. 9 is a sequence diagram of an information processing method according to the embodiment of the present disclosure.

The information processing system 10 according to the present embodiment and the configurations of the user terminal 100 and the server 300 included in the information processing system 10 have been described in detail above. Next, an information processing method according to the present embodiment will be described with reference to FIG. 9. FIG. 9 is a sequence diagram of an information processing method according to an embodiment of the present disclosure.

Specifically, as illustrated in FIG. 9, the information processing method according to the present embodiment includes a plurality of steps, namely, step S101 to step S105. Hereinafter, details of each step included in the information processing method according to the present embodiment will be described.

The user terminal 100 captures an image of the user 800 or the article 810 (real object) and transmits the image to the server 300 (step S101).

The user terminal 100 receives an input from the user 800, various sensing data, and the like, and transmits the received information to the server 300 as a parameter (step S102).

The server 300 performs recognition processing on the image and classifies the real object into a category (step S103).

The server 300 generates a virtual object using the category, the image, and the parameter (step S104).

The server 300 transmits the generated virtual object to the user terminal 100 (step S105).

In the present embodiment, instead of generating a virtual object using a latent variable obtained based on an image, the latent variable is adjusted based on a parameter, and a virtual object is generated using the adjusted latent variable. With this configuration, it is possible, in the present embodiment, to obtain a virtual object or the like in which certain features are emphasized based on various parameters, instead of a virtual object simply similar to a real object. As a result, according to the present embodiment, virtual objects of various variations can be obtained, and an added value can be given to the generated virtual object.

3. EXEMPLARY EMBODIMENTS

The details of the information processing method in the embodiment of the present disclosure have been described above. Next, an example of information processing according to the present embodiment will be described more specifically with reference to a specific exemplary embodiment. Note that the following exemplary embodiments are merely examples of the information processing according to the present embodiment, and the information processing according to the present embodiment is not limited to the following examples.

3.1 First Exemplary Embodiment

First, an example in which the embodiment of the present disclosure is applied to a secondary distribution system using an e-commerce platform will be described. Here, the secondary distribution refers to reselling a product (article) 810 once sold to a consumer as a second-hand product, in contrast to primary distribution of selling a new product.

(Subject)

Figure 10:
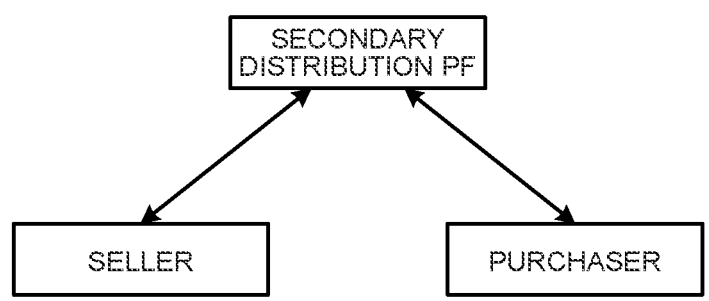
FIG. 10 is a diagram illustrating a subject related to a secondary distribution service according to a first exemplary embodiment.

First, a subject related to a secondary distribution service will be described with reference to FIG. 10. FIG. 10 is a diagram illustrating a subject related to a secondary distribution service according to a first exemplary embodiment. As illustrated in FIG. 10, subjects related to the secondary distribution service are a seller, a purchaser, and a secondary distribution platform. The secondary distribution platform provides an e-commerce platform in which a product 810 is traded, that is, bought and sold via a network between a seller who wishes to sell the product 810 and a purchaser who wishes to purchase the product 810. The seller sells product 810 through a secondary distribution platform. The purchaser purchases the product 810 through the secondary distribution platform.

In this manner, since transactions in the secondary distribution are performed through the secondary distribution platform are performed through a network without going through a physical store, the purchaser is to confirm conditions and the like of the product 810 with an image and the like, unlike the purchase at the physical store. This sometimes makes it difficult for the purchaser to determine an appropriate price of the product 810, leading to occurrence of hesitation to purchase the product. That is, such a situation has been a hindrance in promotion of utilizing secondary distribution through the secondary distribution platform.

In order to provide a purchaser with more detailed information for determination of appropriate price and whether to make a purchase, for example, Patent Literature 1 listed above as the Citation List discloses a technique of acquiring information regarding the product 810 (such as purchase price, purchase date and time, and period of use), estimating the quality conditions of the product 810, and reflecting the estimation result in the price of the product 810. By using such a technology, the purchaser can be provided with a price reflecting detailed conditions of the product 810 that cannot be obvious from the image, and thus can feel safe with the purchase. This will result in promotion of use of secondary distribution through the secondary distribution platform.

However, the present inventors have found that there is still room to improve the secondary distribution platform in order to promote secondary distribution through the secondary distribution platform. For example, according to the technique disclosed in Patent Literature 1, the price is determined with reference to a trial period of the product 810 or the like. When the price is determined in this manner, the price would not exceed the price at which the product 810 is sold as a new product, and values such as the rarity of the product 810 and the degree of stimulating the collectors' appetite for the product would not be reflected in the price. That is, in secondary distribution through the secondary distribution platform, the product 810 may only have value as a second-hand product. Therefore, since the seller has to sell the product at a price far from the value of the product 810 that the seller feels, the seller might hesitate to post the product for sale.

Therefore, in view of the above situation, the present inventors have conceived of generating and using the icon 910 of the product 810 to be traded in order to create and add a value other than a value as a mere second-hand product to the product 810 in secondary distribution through a secondary distribution platform. For example, this concept makes it possible for one user 800 to view the icon 910 of the product 810 owned by another user 800 and rent the icon 910. In this manner, the user 800 can acquire and collect various icons 910, according to the technology conceived by the present inventors, making it possible to provide a new value of the product 810 that cannot be created by the product 810 alone. Furthermore, since the purchaser can purchase the actual product 810 while enjoying the icon 910, making it possible to promote secondary distribution of the product 810. In addition, preparation is made to allow the product 810 to be purchased from the icon information so as to promote distribution of the product 810.

This incudes, at that time, according to the concept obtained by the present inventors, the idea of generating the icon 910 of the product 810 having a design changed based on information such as a sales period, a place of sale, and a sales event of the product 810 instead of just generating the icon 910 very close to the product 810 based on the image of the product 810. In this manner, the user 800 can enjoy the icon 910 that variously changes according to the information such as the sales period, the place of sale, and the sales event of the product 810, making it possible to offer further added value to the product 810. In present exemplary embodiment, the above-described embodiment of the present disclosure can be applied when generating such an icon 910. Hereinafter, details of the present exemplary embodiment will be sequentially described.

(Configuration of Information Processing System)

Next, a configuration of an information processing system 10*a* according to the present exemplary embodiment will be described with reference to FIG. 11. FIG. 11 is a configuration diagram of an information processing system 10*a* according to the first exemplary embodiment. As illustrated in FIG. 11, the information processing system 10 according to the present exemplary embodiment includes a user terminal 100*a* on the seller side, a user terminal 100*b* on the purchaser side, and a server 300*a*, which are communicably connected to each other via a communication network 500. Although the information processing system 10*a* according to the present exemplary embodiment is illustrated as including two user terminals 100*a* and 100*b*, as illustrated in FIG. 11, the number is not limited to two in the present embodiment. For example, the information processing system 10*a* according to the present exemplary embodiment may include three or more (plurality of) user terminals 100. Hereinafter, an outline of each device included in the information processing system 10*a* according to the present exemplary embodiment will be described.

—User Terminal 100*a* and 100*b*—

The user terminal 100*a* is an information processing terminal used by the seller, and the user terminal 100*b* is an information processing terminal used by the purchaser. For example, the user terminals 100*a* and 100*b* can be provided as wearable devices such as a tablet, a smartphone, a mobile phone, a laptop PC, a notebook PC, a desktop PC, and an HMD.

Details of the user terminals 100*a* and 100*b* will be described below.

—Server 300*a*—

The server 300*a* is a server device that includes a computer and provides a secondary distribution platform, for example. The server 300*a* provides an e-commerce platform in which the product 810 is traded, that is, bought and sold via a network between a seller who wishes to sell the product 810 and a purchaser who wishes to purchase the product 810. Details of the server 300*a* will be described below.

(Configuration of User Terminals 100*a* and 100*b*)

Next, configurations of the user terminals 100*a* and 100*b* according to the present exemplary embodiment will be described. However, the user terminals 100*a* and 100*b* according to the present exemplary embodiment have a configuration similar to the configuration of the user terminal 100 according to the present embodiment described above except for the following points, and thus, description of the similar points is omitted here.

The user terminals 100*a* and 100*b* according to the present exemplary embodiment have a personal authentication information acquisition function. For example, the personal authentication information acquisition function is implemented by imaging devices mounted on the user terminals 100*a* and 100*b* or a fingerprint authentication sensor, for example. For example, the personal authentication information acquisition function acquires fingerprint data, face image data, or iris image data of the seller or the purchaser as the personal authentication information. When the authentication has been appropriately executed, other functions of the user terminals 100*a* and 100*b* can be executed, or data can be transmitted to the server 300*a*. In the present exemplary embodiment, the personal authentication is not limited to fingerprint authentication, face authentication, iris authentication, and the like, and may be gait authentication, pulse authentication, and the like.

(Configuration of Server 300*a*)

Figure 12:
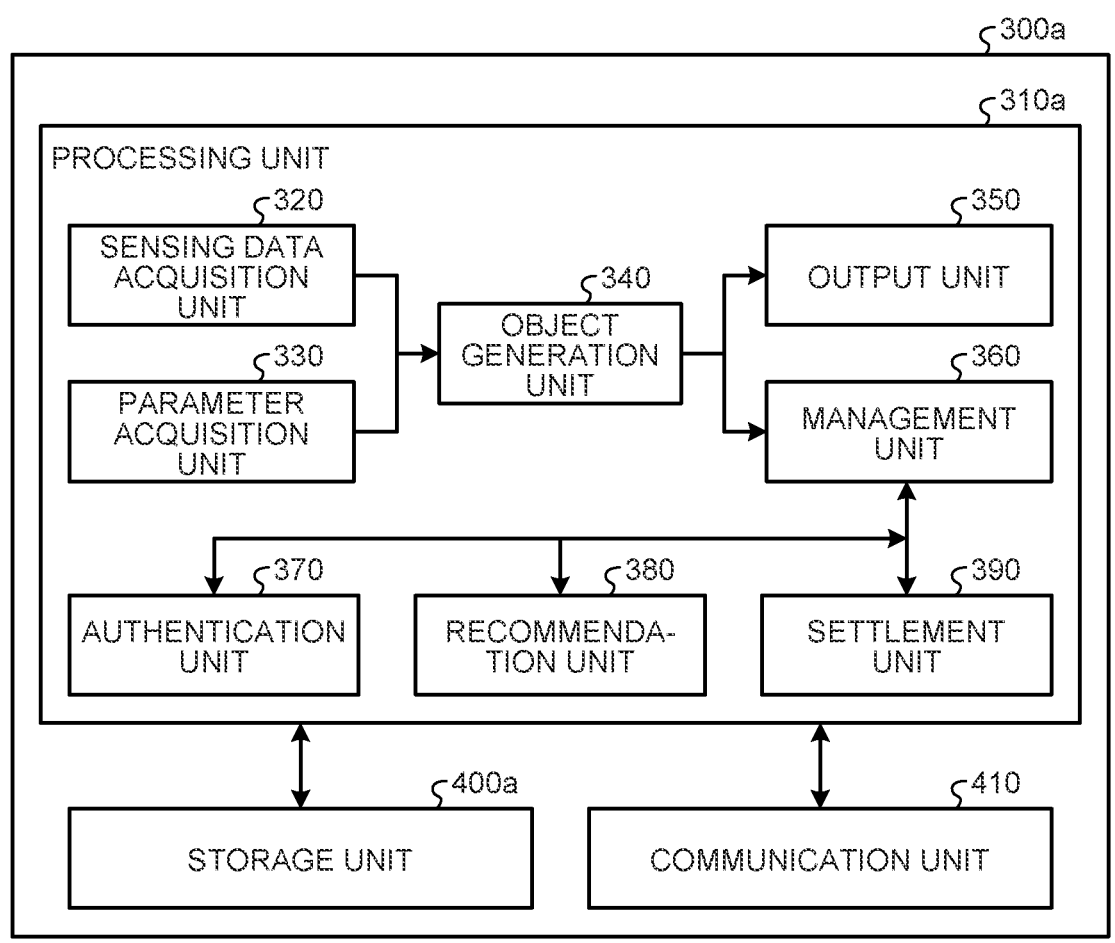
FIG. 12 is a block diagram of a server according to the first exemplary embodiment.
Figure 13:
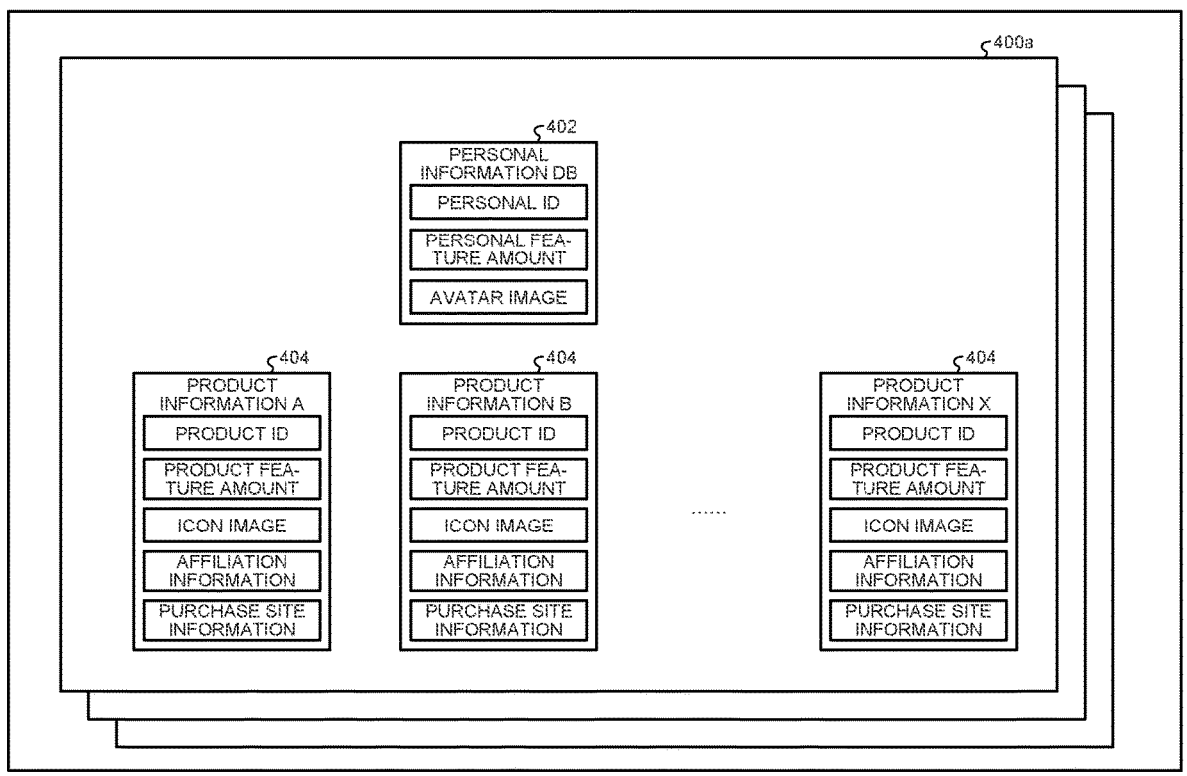
FIG. 13 is a diagram (part 1) illustrating a configuration example of a database stored in a storage unit in FIG. 12.

Next, a configuration of the server 300*a* according to the present exemplary embodiment will be described with reference to FIGS. 12 and 13. FIG. 12 is a block diagram of the server 300*a* according to the first exemplary embodiment. FIG. 13 is a diagram illustrating a configuration example of a database stored in a storage unit 400*a* of FIG. 12.

As illustrated in FIG. 13, the server 300*a* mainly includes a processing unit 310*a*, a storage unit 400*a*, and a communication unit 410. Hereinafter, configurations of the server 300*a* will be described. However, the server 300*a* has a configuration similar to the configuration of the server 300 according to the present embodiment described above except for the following points, and thus, description of the similar points is omitted here.

—Processing Unit 310*a*—

The processing unit 310*a* is provided in the server 300*a* and can control individual blocks of the server 300*a*. Furthermore, the processing unit 310*a* can also function as a sensing data acquisition unit (data acquisition unit) 320, a parameter acquisition unit 330, an object generation unit 340, an output unit 350, a management unit 360, an authentication unit 370, a recommendation unit 380, and a settlement unit 390. Hereinafter, configurations of the processing unit 310a according to the present exemplary embodiment will be described. However, the processing unit 310a has a configuration similar to the configuration of the processing unit 310 according to the present embodiment described above except for the following points, and thus, description of the similar points is omitted here.

The authentication unit 370 can perform personal authentication of the user 800. Specifically, the authentication unit 370 can perform personal authentication by acquiring the personal authentication information of the user 800 from the user terminals 100a and 100b, and collating the personal authentication information with the personal feature amount (personal authentication information) associated with the personal identification (ID) of the personal information Database (DB) 402 (refer to FIG. 13), stored in the storage unit 400a in advance. For example, the authentication unit 370 can perform personal authentication based on personal authentication information, represented by fingerprint information, iris information, or face information of the user 800.

The recommendation unit 380 can select the product 810 or the icon 910 to be recommended to the purchaser based on various types of information regarding the purchaser (purchase history of product 810, use of icon 910, etc.), and can provide the purchaser with information regarding the selected product 810 or the icon 910.

The settlement unit 390 presents the price to the purchaser based on the product 810 selected by the purchaser. When having received an instruction of the settlement processing from the purchaser, the settlement unit 390 can perform the settlement processing based on the presented price.

—Storage Unit 400a—

The storage unit 400a is provided in the server 300a, and stores programs, information, and the like for the above-described processing unit 310 to execute various types of processing, information of the user 800, information of the avatar 900, information of the icon 910, and the like. Specifically, as illustrated in FIG. 13, the storage unit 400a mainly stores a personal information database (DB) 402 and a product information database (DB) 404.

The personal information DB 402 stores a personal ID, a personal feature amount, and an image of the avatar 900. The personal ID indicates identification information identifying the user 800 who is a seller or a purchaser. The personal feature amount can be information such as face information, fingerprint information, or iris information of the user 800, and can be used as personal authentication information. Furthermore, the avatar image is image information of the avatar 900 (virtual object) associated with the user 800.

The product information DB 404 stores a product ID, a product feature amount, an image of the icon 910, affiliation information, and purchase site information. Product ID is identification information that identifies the product 810. The product feature amount indicates a feature amount extracted from an image of a product. The image of the icon 910 corresponds to image information of the icon 910 (virtual object) associated with the product 810. The affiliation information is information indicating whether the user 800 is an owner or a person who is renting the product 810. The purchase site information is information indicating a site where the product 810 can be purchased, and a transaction state (for example, selling, renting, etc.) of the product 810 or the icon 910. Furthermore, the product information DB 404 may also store information such as a brand name, a product category, a size, years of use, and quality, an image of the product 810, and the like.

(Information Processing Method)

The configurations of the information processing system 1a according to the present exemplary embodiment and the user terminals 100a and 10b and the server 300a included in the information processing system 10a have been described in detail above. Hereinafter, an information processing method according to the present exemplary embodiment will be described. The information processing according to the present exemplary embodiment includes a plurality of stages, specifically, a stage of generating the avatar 900, a stage of generating the icon 910, a stage of viewing the avatar 900/icon 910, a stage of renting the icon 910, and a stage of purchasing the product 810. Hereinafter, information processing according to the present exemplary embodiment will be described for each stage.

—Stage of Generating Avatar—

Figure 14:
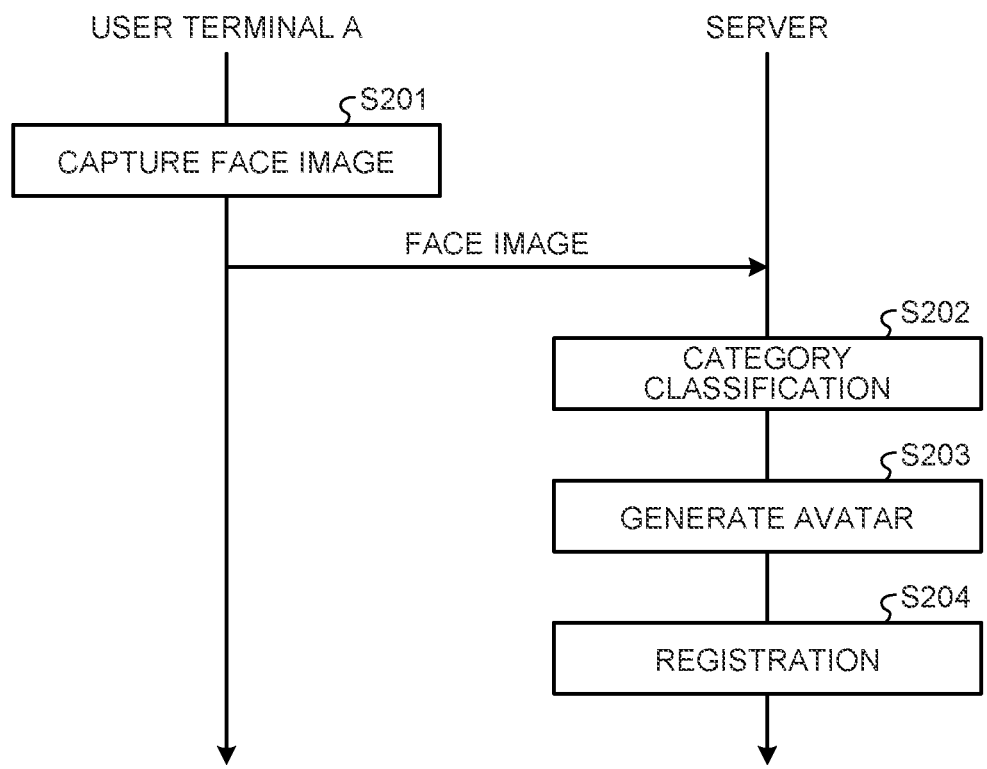
FIG. 14 is a sequence diagram (part 1) of the information processing method according to the first exemplary embodiment.

First, a stage of generating the avatar 900 will be described with reference to FIG. 14. FIG. 14 is a sequence diagram of the information processing method according to the first exemplary embodiment, specifically illustrating a sequence diagram of the stage of generating the avatar 900. As illustrated in FIG. 14, the stage of generating the avatar 900 includes a plurality of steps, namely, step S201 to step S204. Details of each step will be described below.

First, the user (seller) 800 performs personal authentication of themselves using a user terminal (user terminal A) 100a and activates an imaging function. Note that the user for the stage of generating the avatar 900 is not limited to the seller, and may be a purchaser.

Next, the user (seller) 800 captures an own face image using the user terminal 100a (step S201). At this time, although not illustrated in FIG. 14, the user 800 inputs information such as their age as a parameter using the user terminal 100a, or the user terminal 100a acquires biometric information (heart rate, body temperature, etc.) of the user 800 as a parameter. The user terminal 100a then transmits information such as the face image, the parameter, and the personal ID of the user 800 to the server 300a.

Next, the server 300a acquires feature amounts from the face image and performs category classifications (including sex, hairstyle, hair color, contour of a face, skin color, shape of an eyebrow, shapes of eyes, color of eyes, shape of nose, shape of mouth, position of moles, shapes of ears, for example) (step S202). Subsequently, the server 300a generates the avatar 900 corresponding to the user 800 based on the face image, the feature amounts, and the category (step S203). At this time, the server 300a may adjust the avatar 900 by parameters using the above-described embodiment of the present disclosure. With this operation, the user 800 can obtain the avatar 900 having been changed in design according to the parameters instead of the avatar 900 which is simply very similar to the user, leading to acquisition of new enjoyment (added values).

Furthermore, the server 300a registers the generated avatar 900 in association with the identification information (personal ID) of the user 800 (step S204).

—Generation of Icons—

Figure 15:
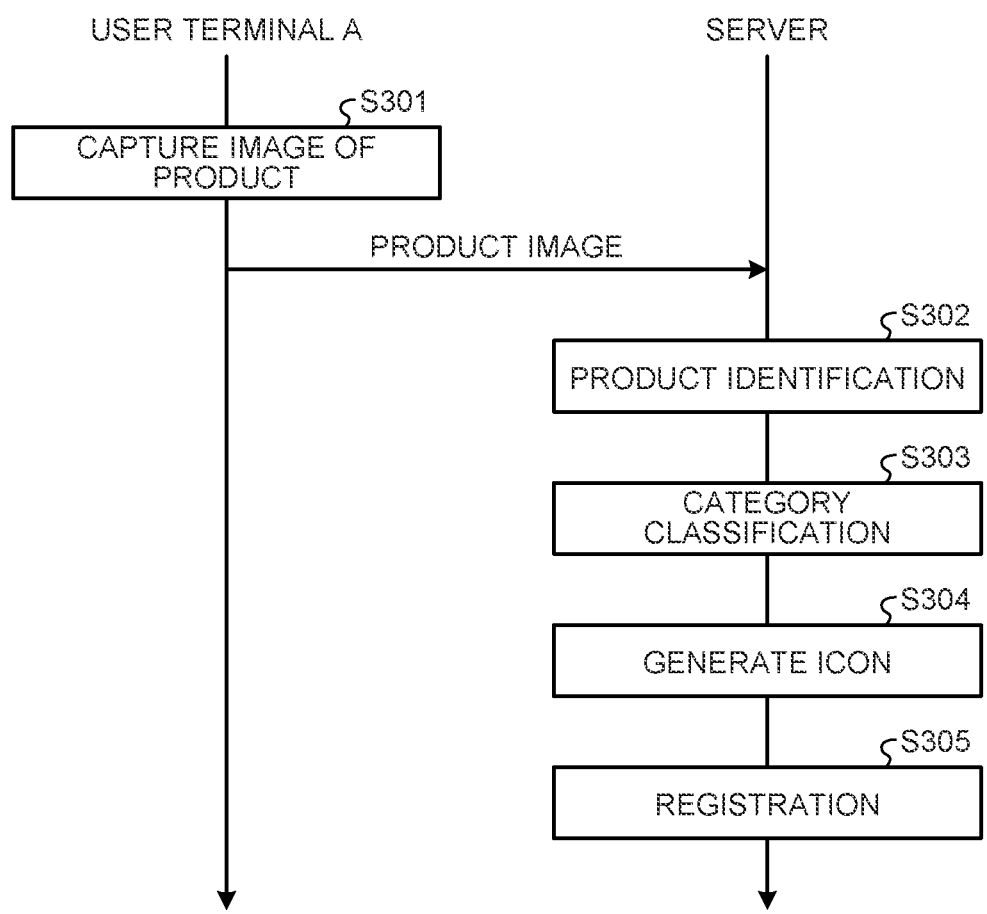
FIG. 15 is a sequence diagram (part 2) of the information processing method according to the first exemplary embodiment.

Next, a stage of generating the icon 910 will be described with reference to FIG. 15. FIG. 15 is a sequence diagram of the information processing method according to the first exemplary embodiment, specifically illustrating a sequence diagram of the stage of generating the icon 910. As illustrated in FIG. 15, the stage of generating the icon 910 includes a plurality of steps, namely, step S301 to step S305. Details of each step will be described below.

First, the user (seller) 800 performs personal authentication of themselves using a user terminal (user terminal A) 100a and activates an imaging function.

Next, the user (seller) 800 captures an image of the product 810 using the user terminal 100a (step S301). At this time, although not illustrated in FIG. 15, the user 800 uses the user terminal 100a to input information regarding the product 810, such as the years of use, the purchase price, the quality, the place of purchase, and a site where the product 810 can be purchased, the brand name, and the size, as parameters and product information. Subsequently, the user terminal 100a transmits information such as the product image, the parameter, the product information, and the personal ID of the user 800 to the server 300a.

Next, the server 300a acquires feature amounts (such as shape, decoration, pattern, and texture) from the product image, and identifies, based on the feature amount, whether the product 810 is the same as the product 810 in the product information associated with the information of another user 800 (step S302). In a case where the product of the acquired image is the product 810 associated with the another user 800, the server 300a may copy and use the already generated image of the icon 910 (reuse of the icon 910).

Next, in a case where the product 810 of the acquired image is not the product 810 associated with another user 800, the server 300a performs category classification (for example, the type, material, size, and the like of a handbag, a shoulder bag, a tote bag, and the like) regarding the product 810 based on the feature amounts (step S303). The server 300a then generates the icon 910 corresponding to the product 810 based on the product image, the feature amounts, and the category (step S304). At this time, the server 300a may adjust the icon 910 by a parameter using the above-described embodiment of the present disclosure. For example, in a case where quality information has been obtained as a parameter (by methods such as manual input by the user 800 and quality recognition by image analysis), the icon 910 as a generation target is generated so as to have changes in gloss or color tones, for example, from the original icon 910 so as to have more sense of rareness. Furthermore, when there is acquired information as a parameter, indicating that the sale volume of products 810 is small, that the sales was performed in a limited opportunity such as an event, or that the product is designed by a celebrity, the icon 910 is generated to have more sense of rareness. In this manner, the user 800 can obtain the icon 910 having various changes in design by the parameters instead of the icon 910 that is simply very similar to the product 810, leading to acquisition of new enjoyment (added values).

Furthermore, the server 300a registers the generated icon 910 in association with the identification information (personal ID) of the user 800 (step S305). In the present exemplary embodiment, when registering the icon 910, the server 300a preferably assigns an icon ID associated with the icon 910. Furthermore, in the present exemplary embodiment, the server 300a preferably registers information input from the user 800, specifically information regarding the years of use, the purchase price, the quality, the purchase place, the site where the product 810 can be purchased, the brand name, and the size information regarding the product 810, in association with the icon 910 as the product information.

As described above, in the present exemplary embodiment, the generated avatar 900 and icon 910 are to be registered in association with the identification information of the user 800.

In the present exemplary embodiment, the user 800 can also image a product 810 owned by another person, generate an icon 910, and associate the generated icon 910 with their identification information. In this case, the icon is referred to as "rental of the icon 910". However, in the present exemplary embodiment, in the case of such "rental of the icon 910", the actual product 810 is owned by another person, and thus, it is preferable to define that the "icon 910" cannot be permanently owned, and the possession (rental) of the "icon 910" is to be terminated in a preset period. For example, in the case of "rental", the user 800 registers a period at the time of registration of the icon 910 or the like, and when the registered period has elapsed, the server 300a cancels the association of the rental "icon 910" with the identification information of the user 800 that has performed the rental. In the present exemplary embodiment, in a case where the period has not been set, the user 800 may permanently possess the "icon 910".

—Viewing Avatars/Icons—

Figure 16:
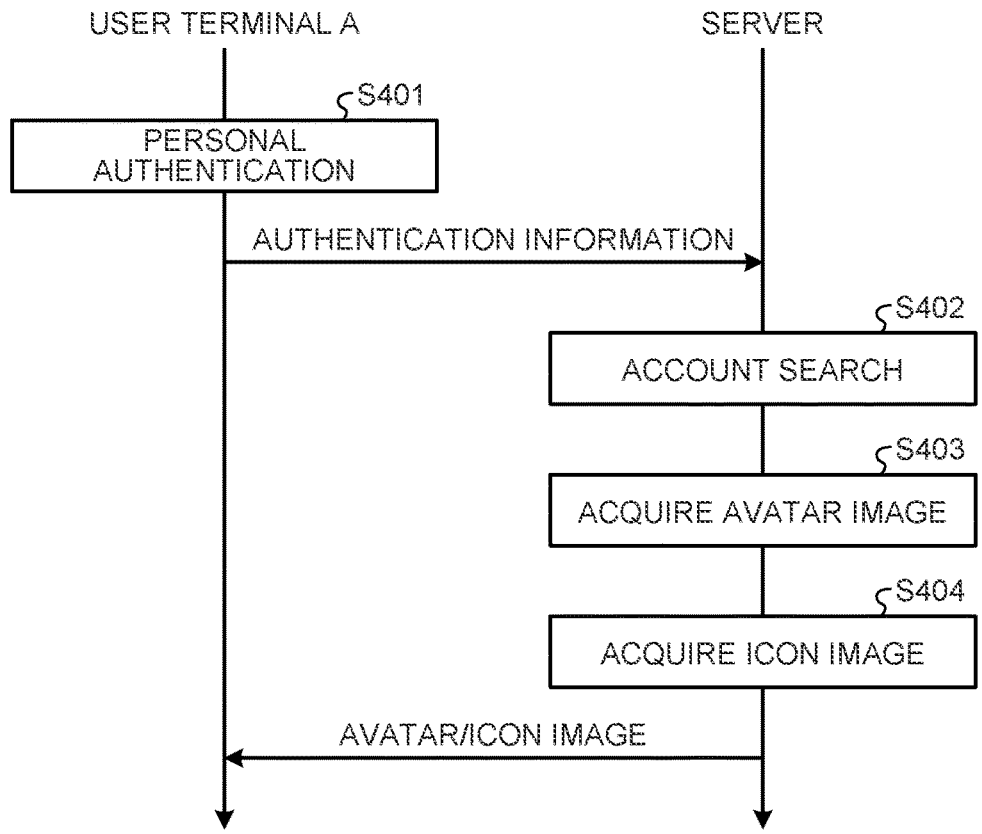
FIG. 16 is a sequence diagram (part 3) of the information processing method according to the first exemplary embodiment.
Figure 17:
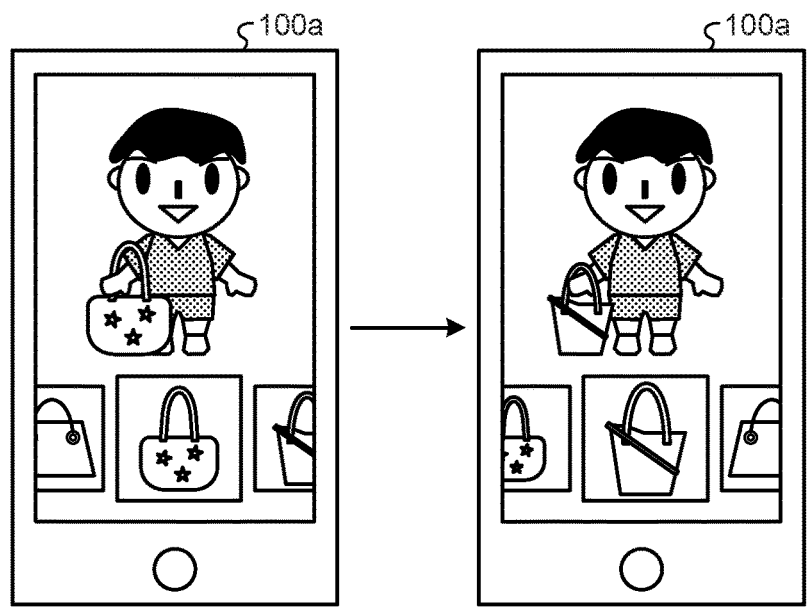
FIG. 17 is a diagram (part 1) illustrating an example of a screen according to the first exemplary embodiment.

Next, the stage of viewing the avatar 900/icon 910 will be described with reference to FIGS. 16 and 17. FIG. 16 is a sequence diagram of the information processing method according to the first exemplary embodiment, specifically illustrating a sequence diagram of the stage of viewing the avatar 900/icon 910. FIG. 17 is a diagram illustrating an example of a screen according to the first exemplary embodiment, specifically illustrating an example of a screen in the stage of viewing the avatar 900/icon 910.

As illustrated in FIG. 16, the stage of viewing avatar 900/icon 910 includes a plurality of steps, namely, step S401 to step S404. Details of each step will be described below.

First, the user terminal (user terminal A) 100a performs personal authentication of the user 800, and transmits personal ID and personal authentication information of the user 800 to the server 300a (step S401).

Next, the server 300a searches for an account of the user 800 using the acquired personal ID and the like (step S402). In a case where the account of the user 800 is successfully acquired, the server 300a acquires the image of the avatar 900 associated with the user 800 (step S403).

Furthermore, in a case where the account of the user 800 is successfully acquired, the server 300a acquires the image of the icon 910 associated with the user 800 (step S404). Subsequently, the server 300a transmits the acquired image of the avatar 900 and the acquired image of the icon 910 to the user terminal (user terminal A) 100a.

In this manner, the user 800 can view the avatar 900 and the icon 910 via the user terminal a. For example, as illustrated in FIG. 17, in the present exemplary embodiment, the avatar 900 can be viewed in a state of being equipped with the icon 910. Specifically, on the screen illustrated in FIG. 17, it is possible for the user 800 to view the icons 910 of the own products 810 by performing a scroll operation on the icons 910. In addition, by selecting one icon 910 out of the icons 910, it is possible for the user to view an image in which the avatar 900 is equipped with the selected icon 910.

Note that the user 800 in the stage of viewing the avatar 900/icon 910 is not limited to the seller, and may be a purchaser.

—Rental of Icons—

Figure 18:
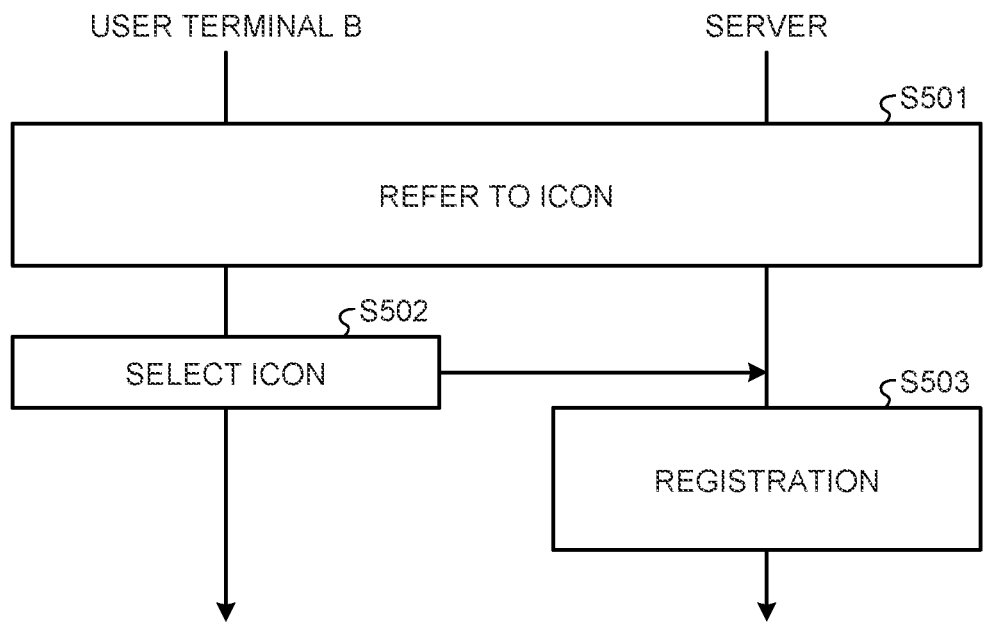
FIG. 18 is a sequence diagram (part 4) of the information processing method according to the first exemplary embodiment.
Figure 19:
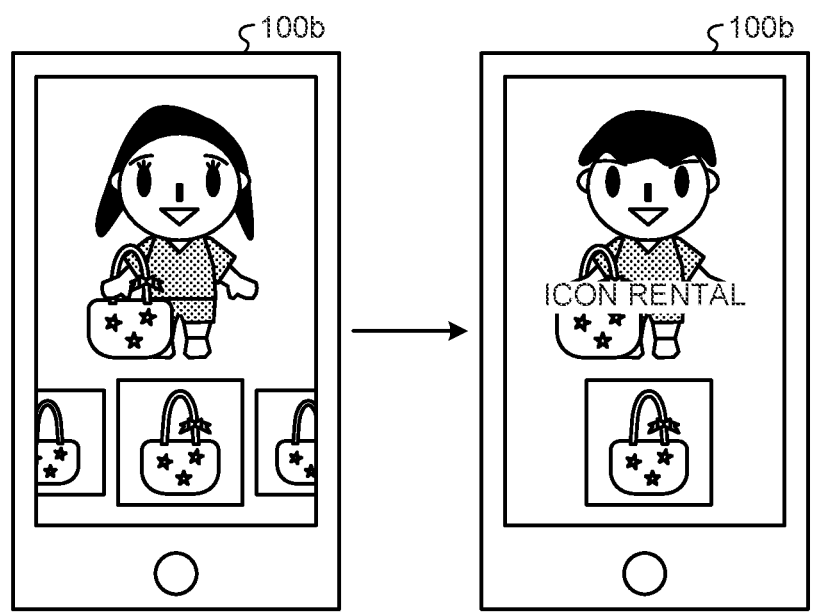
FIG. 19 is a diagram (part 2) illustrating an example of a screen according to the first exemplary embodiment.

Next, the stage of renting the icon 910 will be described with reference to FIGS. 18 and 19. FIG. 18 is a sequence diagram of the information processing method according to the first exemplary embodiment, specifically illustrating a sequence diagram of a stage of renting the icon 910. Furthermore, FIG. 19 is a diagram illustrating an example of a screen according to the first exemplary embodiment, and specifically illustrates an example of a screen at the stage of renting the icon 910.

As illustrated in FIG. 18, the stage of renting the icon 910 includes a plurality of steps, namely, step S501 to step S503. Details of each step will be described below.

First, the user terminal (user terminal B) 100*b* performs personal authentication of the user 800, and transmits the personal ID and personal authentication information of the user 800 to the server 300*a*.

Next, the user terminal 100*b* and the server 300*a* view the icon 910 similarly to the above-described stage of viewing the avatar 900/icon 910 (step S501).

The user 800 views an icon 910 owned by another user 800 via the user terminal 100*b*, and selects an icon 910 that the user desires to rent from among the icons (step S502). Subsequently, the user terminal 100*b* transmits the information of the selected icon 910 to the server 300*a*.

The server 300*a* registers the selected icon 910 in association with the identification information (personal ID) of the user 800 (step S503).

For example, as illustrated in FIG. 19, in the present exemplary embodiment, when the male user 800 selects one icon 910 from a plurality of icons 910 possessed by the female user 800 illustrated on the left side, the possession of the selected icon 910 is transferred to the male user 800 illustrated on the right side, indicating that the "icon 910" is rented.

Note that, in the present exemplary embodiment, in a case where the user 800 possesses (rents) the "icon 910" alone even after a predetermined period has elapsed, it is allowable to perform presentation of prompting the user 800 to purchase the product 810 corresponding to the "icon 910" (for example, presentation of displaying information about a purchase site for the product 810).

—Purchase of Product—

Figure 20:
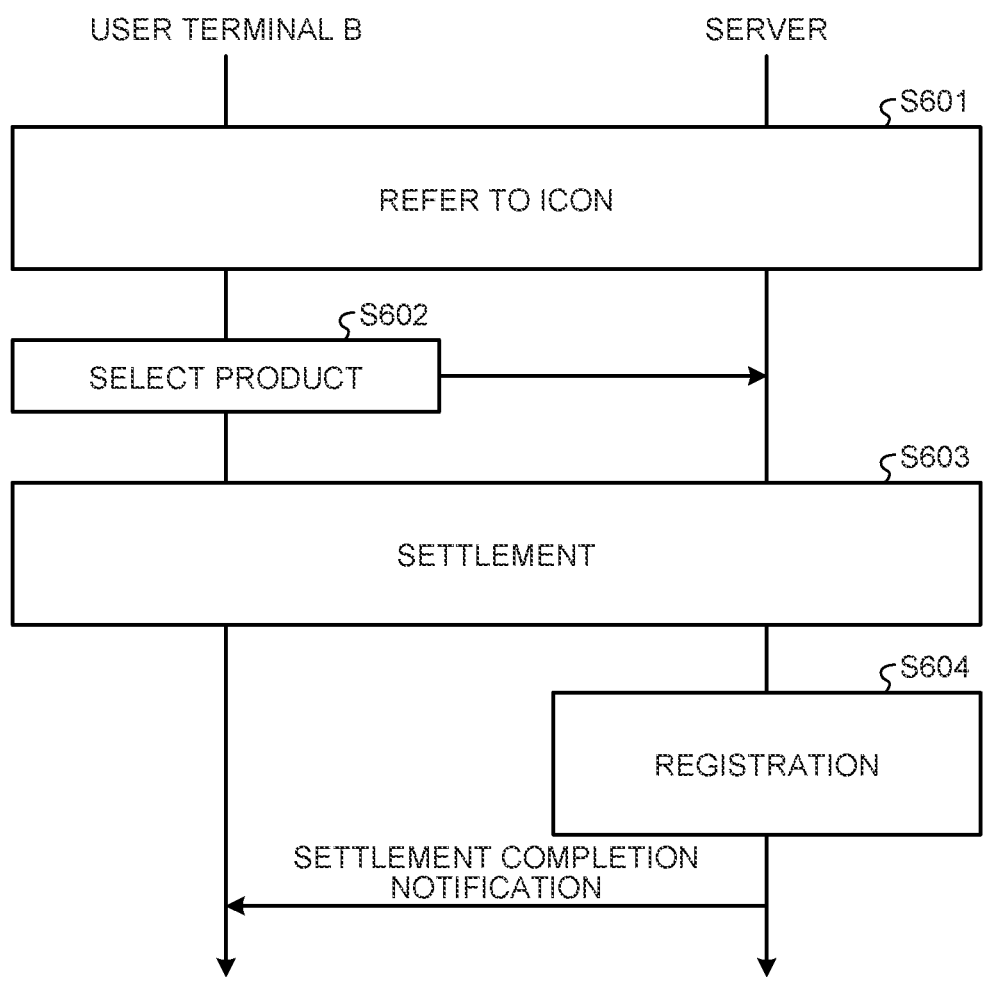
FIG. 20 is a sequence diagram (part 5) of the information processing method according to the first exemplary embodiment.
Figure 21:
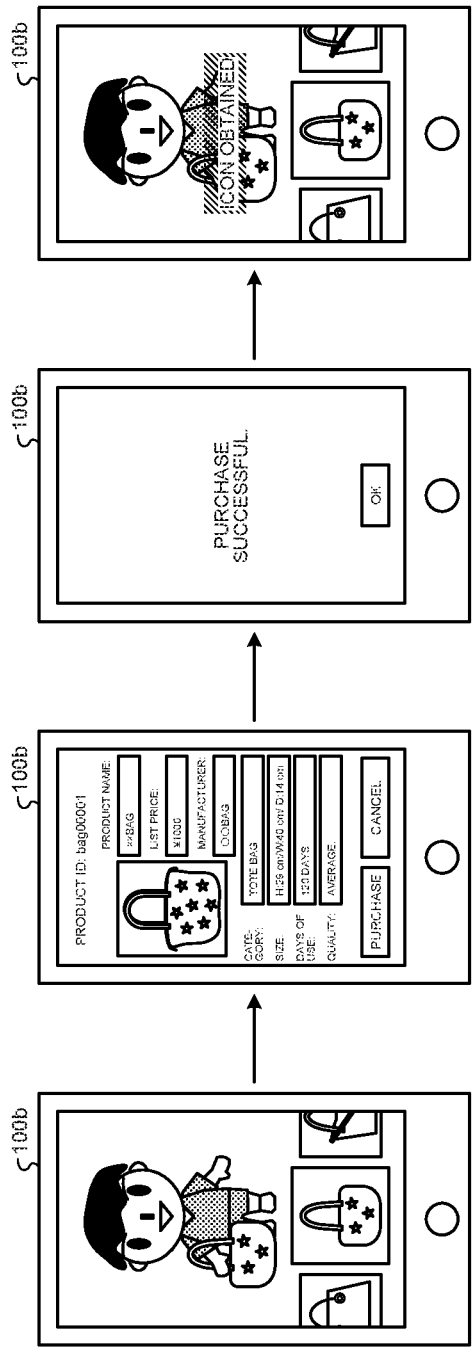
FIG. 21 is a diagram (part 3) illustrating an example of a screen according to the first exemplary embodiment.
Figure 22:
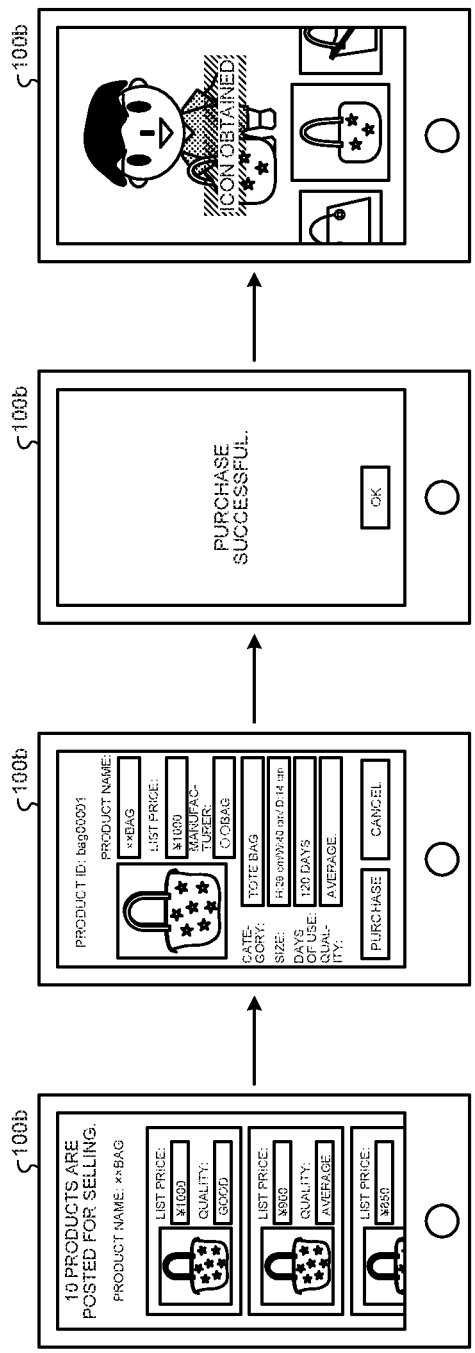
FIG. 22 is a diagram (part 4) illustrating an example of a screen according to the first exemplary embodiment.
Figure 23:
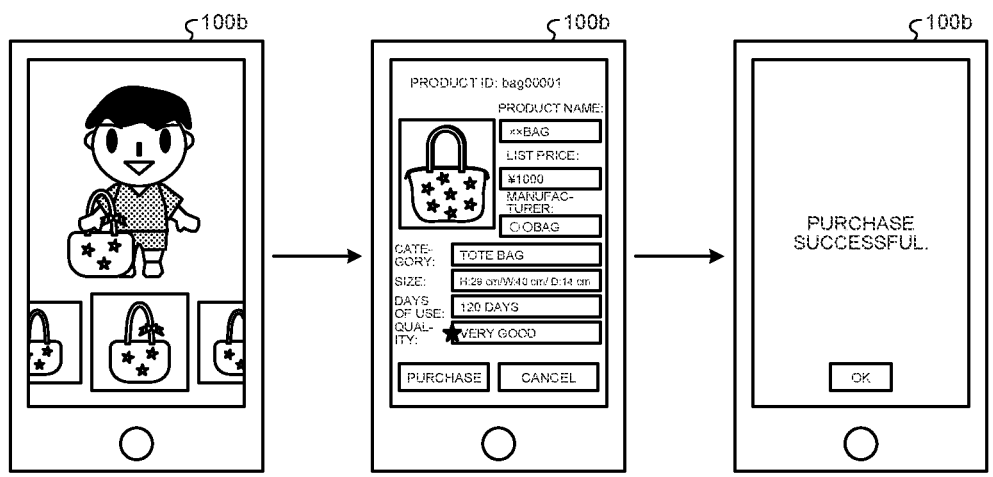
FIG. 23 is a diagram (part 5) illustrating an example of a screen according to the first exemplary embodiment.

Next, a stage of purchasing the product 810 will be described with reference to FIGS. 20 to 23. FIG. 20 is a sequence diagram of the information processing method according to the first exemplary embodiment, specifically illustrating a sequence diagram of the stage of purchasing the product 810. FIGS. 21 to 23 are diagrams illustrating an example of a screen according to the first exemplary embodiment, specifically illustrating an example of a screen at the stage of purchasing the product 810. Note that, in the present exemplary embodiment, the purchase of the product 810 means that the product 810 corresponding to the icon 910 selected by the user 800 is actually purchased.

As illustrated in FIG. 20, the stage of purchasing the product 810 includes a plurality of steps, namely, step S601 to step S604. Details of each step will be described below.

First, the user terminal (user terminal B) 100*b* performs personal authentication of the user (purchaser) 800, and transmits the personal ID and personal authentication information of the user 800 to the server 300*a*.

Next, the user terminal 100*b* and the server 300*a* view the icon 910 similarly to the above-described stage of viewing the avatar 900/icon 910 (step S601).

The user 800 views an icon 910 owned by another user 800 via the user terminal 100*b*, and selects an icon 910 that the user desires to purchase from among the icons (step S602). Subsequently, the user terminal 100*b* transmits the information of the selected icon 910 to the server 300*a*.

Next, the user terminal 100*b* and the server 300*a* connect to a purchase site corresponding to the product 810 of the selected icon 910, and execute purchase and settlement of the product 810 (step S603).

Subsequently, the server 300*a* registers the icon 910 corresponding to the product 810 purchased by the user 800 in association with the identification information (personal ID) of the user 800 as the owner of the product 810 (step S604). That is, the user 800 is now a permanent owner of the icon 910. The server 300*a* then transmits a settlement completion notification and the like to the user terminal (user terminal B) 100*b*.

For example, as illustrated in FIG. 21, in the present exemplary embodiment, the user (purchaser) 800 views, via the user terminal (user terminal B) 100*b*, the icon 910 that the user (purchaser) has already rented, and selects one icon 910 from the plurality of icons 910 that the person has rented. In the present exemplary embodiment, by selecting the icon 910, it is possible to view the image and product information regarding the product 810 corresponding to the icon 910 and to perform the purchase procedure. Furthermore, in the present exemplary embodiment, when the product 810 is purchased, it is preferable to notify that the user has become the permanent owner of the icon 910 corresponding to the product 810. In this manner, in the present exemplary embodiment, by allowing the icon 910 to be rented to the user 800 to guide the user 800 to be attached to the icon 910, it is possible to stimulate the appetite of the user 800 to purchase the actual product 810 corresponding to the icon 910.

Furthermore, in the present exemplary embodiment, the product 810 may be purchased without renting the icon 910. For example, as illustrated in FIG. 22, in the present exemplary embodiment, the user (purchaser) 800 views an EC site, for example, via the user terminal (user terminal B) 100*b* and purchases the product 810. In the present exemplary embodiment, in a case where the purchase processing is completed, the user 800 is the owner of the purchased product 810 and is also the permanent owner of the icon 910 corresponding to the product 810. Therefore, also in the example of FIG. 22, it is preferable to notify that the user has become the permanent owner of the icon 910 corresponding to the product 810. Furthermore, in the example of FIG. 22, the product 810 may be a new product, not limited to a second-hand product. Furthermore, in the present exemplary embodiment, when the product 810 has been purchased by the user (purchaser) 800, the association of the icon 910 of the product 810 with the user (seller) 800 may be cancelled (that is, the icon 910 cannot be confirmed from the user (seller) 800 any longer), or the association of the icon 910 of the product 810 with the user (seller) 800 may be maintained (that is, the icon 910 can be continuously seen from the user (seller) 800). Furthermore, in a case where the association of the icon 910 of the product 810 with the user (seller) 800 is maintained, the product 810 may be sold at a discounted price by the maintained amount. Although the above is the case of purchasing the product 810, the present exemplary embodiment is not limited thereto, and only the icon 910 may be purchased with no purchase of the product 810. Also in this case, the association of the icon 910 with the user (seller) 800 may be cancelled (that is, the icon 910 cannot be checked from the user (seller) 800 any longer), or the association of the icon 910 with the user (seller) 800 may be maintained (that is, the icon 910 can be continuously confirmed from the user (seller) 800).

Furthermore, in the present exemplary embodiment, there might be different icons 910 even for the same type of product 810. For example, as illustrated in FIG. 23, the icon 910 of the good quality product 810 can be set to have a different design from the icons 910 of the other same products 810. Therefore, since the designs are different, the user (purchaser) 800 can easily select the icon 910 of the good quality product 810 having a different design from among the plurality of icons 910 for the same product 810. As a result, in the example of FIG. 23, it is possible to select the good quality product 810 without checking the product information about all the icons 910. That is, according to the example of FIG. 23, the user 800 can easily recognize the quality of the product 810 corresponding to the icon 910 with the icon 910 according to the present exemplary embodiment.

(Modifications)

In the present exemplary embodiment, the avatar 900 may have a change in design in accordance with the time/place/possessed icon 910. For example, the time information may be acquired from the user terminal 100*a*, and the expression or pose of the avatar 900 may be changed according to the acquired time information (for example, morning, daytime, and night). Furthermore, for example, the position information may be acquired from the user terminal 100*a*, and the expression or pose of the avatar 900 may be changed according to the acquired position information (for example, a park, a sea, a shopping center, or the like). Furthermore, in the present exemplary embodiment, the expression or pose of the avatar 900 may be changed according to the type of the icon 910 or the time at which the icon 910 is equipped.

Furthermore, in the present exemplary embodiment, the coordination of the icon 910 provided by the avatar 900 may be recommended in association with the time/place/possessed icon 910. For example, as illustrated in FIG. 24 which is a diagram illustrating a configuration example of a database stored in the storage unit 400*a*, the storage unit 400*a* is assumed to store information of a time or a place at which the user 800 equipped the avatar 900 with the icon 910. More specifically, according to the data illustrated in FIG. 24, for example, it can be seen that the avatar 900 is often equipped with the icon 910 of the bag 1 when the user 800 is in the office, and the avatar 900 is equipped with the icon 910 of the bag 2 when the user 800 is outside or in a café.

Therefore, when it can be recognized from the position information that the user 800 is in an office, the server 300*a* presents, to the user 800, information indicating that equipping the avatar 900 with the icon 910 of a bag 1 is recommended. Furthermore, for example, when it can be recognized from the position information that the user 800 is in a cafe around noon, the server 300*a* presents information indicating that the equipment of the icon 910 of the bag 1 or a bag 2 is recommended to the user 800 based on the following probability. Specifically, referring to FIG. 24, when the user 800 was in the cafe in the same time zone in the past, it can be seen that the avatar 900 is equipped with the icon 910 of the bag 1 twice and the icon 910 of the bag 2 five times. Accordingly, the server 300*a* recommends the icon 910 of the bag 1 with a probability of 2/7 and the icon 910 of the bag 2 with a probability of 5/7.

3.2 Second Exemplary Embodiment

Figure 25:
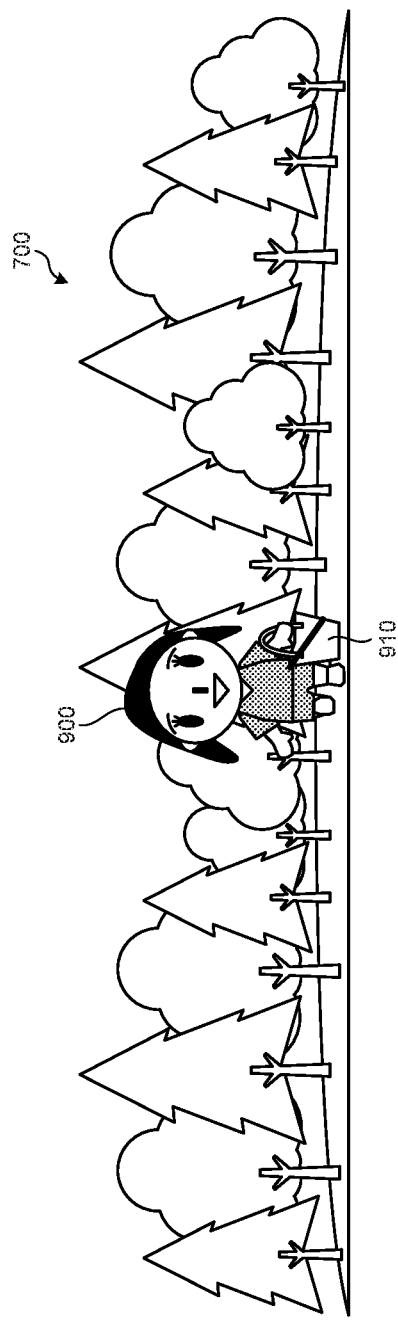
FIG. 25 is a diagram illustrating a second exemplary embodiment.

The embodiment of the present disclosure can be applied to a game or the like in which the avatar 900 moves in the virtual space. Such a second exemplary embodiment will be described with reference to FIG. 25. FIG. 25 is a diagram illustrating the second exemplary embodiment.

As illustrated in FIG. 25, by applying embodiments of the present disclosure, it is possible to generate an avatar 900 that acts as a virtual self of the user 800 or an icon 910 of an item to be fitted with the avatar 900 in a virtual space 700. Specifically, in the present exemplary embodiment, the avatar 900 having an expression according to the biometric information (such as having a flushed face when excited, etc.) can be generated based on the parameter of the biometric information (heart rate, body temperature, etc.) of the user 800. By doing so, the present exemplary embodiment makes it possible to obtain the avatar 900 having various designs according to the biometric information of the user 800, instead of simply obtaining the avatar 900 similar to the user 800. As a result, according to the present exemplary embodiment, it is possible to obtain the avatar 900 corresponding to each time of occurrence of a change in the biometric information of the user 800. This makes it possible for the user 800 to feel the avatar 900 as a virtual self of the user and feel that the real world and the virtual space of the game are linked with each other, leading to achievement of putting an added value to the game. Furthermore, the present exemplary embodiment makes it possible to obtain the avatar 900 having various designs according to the biometric information of the user 800, leading to enjoyment of having variations and surprising effects of the avatar 900.

Furthermore, in the present exemplary embodiment, it is possible to generate the icon 910 having many types of variations in design according to the change in the position information based on the parameter of the position information of the user 800. As a result, according to the present exemplary embodiment, the user 800 can acquire the icons 910 having many types of variations in design, enjoy collecting the icons 910, and enjoy changing the appearance of the avatar 900 using the plurality of icons 910.

In recent years, with the rapid spread of the form of working remotely, an increasing number of companies have started to have meetings online, which had been held as face-to-face meetings. For example, it is conceivable to have a meeting with the "avatars 900" of the participants gathered in a "meeting room" set in the virtual space. At this time, by using the embodiment of the present disclosure, the avatars 900 can be operated such that the avatar 900 follows the motion of the user 800 by using the sensing data of the motion sensor worn by the user 800 who is a participant. Specifically, the latent variable described above is adjusted based on the sensing data of the motion sensor, and the avatar 900 is generated using the adjusted latent variable. With this operation, for example, the movement such as the gesture of the participant (user) 800 is expressed by the avatar 900, making it easier to transmit the intention of the participant.

3.3 Third Exemplary Embodiment

Figure 26:
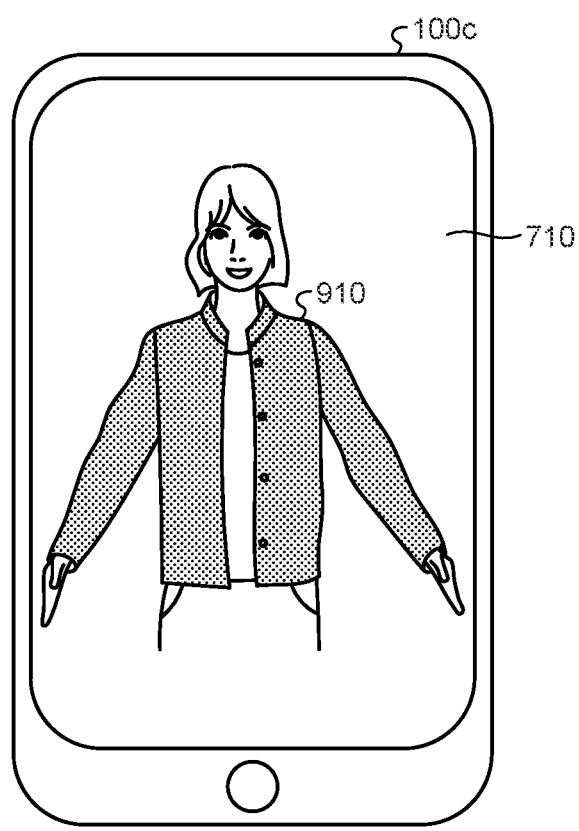
FIG. 26 is a diagram illustrating a third exemplary embodiment.

In recent years, there is a popular technology of augmented reality (AR) in which a virtual object, as additional information to the real world, is superimposed and displayed onto a real space and presented to the user 800. Accordingly, a case of applying the embodiment of the present disclosure to AR will be described with reference to FIG. 26. FIG. 26 is a diagram illustrating a third exemplary embodiment.

For example, in the present exemplary embodiment, an icon 910 of a shirt is generated with the illuminance acquired by the illuminance meter installed in a user terminal 100*c* as a parameter. By using the embodiment of the present disclosure, the icon 910 of a shirt is generated to not only have appearance very similar to the original shirt in reality, but also have a texture corresponding to the illuminance acquired by the illuminance meter installed in the user terminal 100. Then, as illustrated in FIG. 26, the user terminal 100c displays a generated icon 910 to be superimposed on the image of the user 800. In this manner, by displaying the icon 910 having a texture corresponding to the illuminance of the environment where the user 800 exists in reality, the user 800 can obtain an image of a case where the shirt corresponding to the icon 910 is actually worn even if the user does not actually have the shirt at hand. As a result, in the present exemplary embodiment, the user 800 can perform coordination of clothes and the like even without a shirt at hand.

4. SUMMARY

As described above, in the embodiment of the present disclosure, instead of generating a virtual object using a latent variable obtained based on an image, the latent variable is adjusted based on a parameter, and a virtual object is generated using the adjusted latent variable. With this configuration, it is possible, in the present embodiment, to obtain a virtual object or the like in which certain features are emphasized based on various parameters, instead of a virtual object simply similar to a real object. As a result, according to the present embodiment, virtual objects of various variations can be obtained, and an added value can be given to the generated virtual object.

Furthermore, in the above-described embodiment, the user terminal 100 may be prepared as a standalone device by incorporating the functions of the server 300 in the user terminal 100 according to the present embodiment. Alternatively, in the above-described embodiment, the user terminal 100 according to the present embodiment may conduct some functions of the server 300.

5. HARDWARE CONFIGURATION

Figure 27:
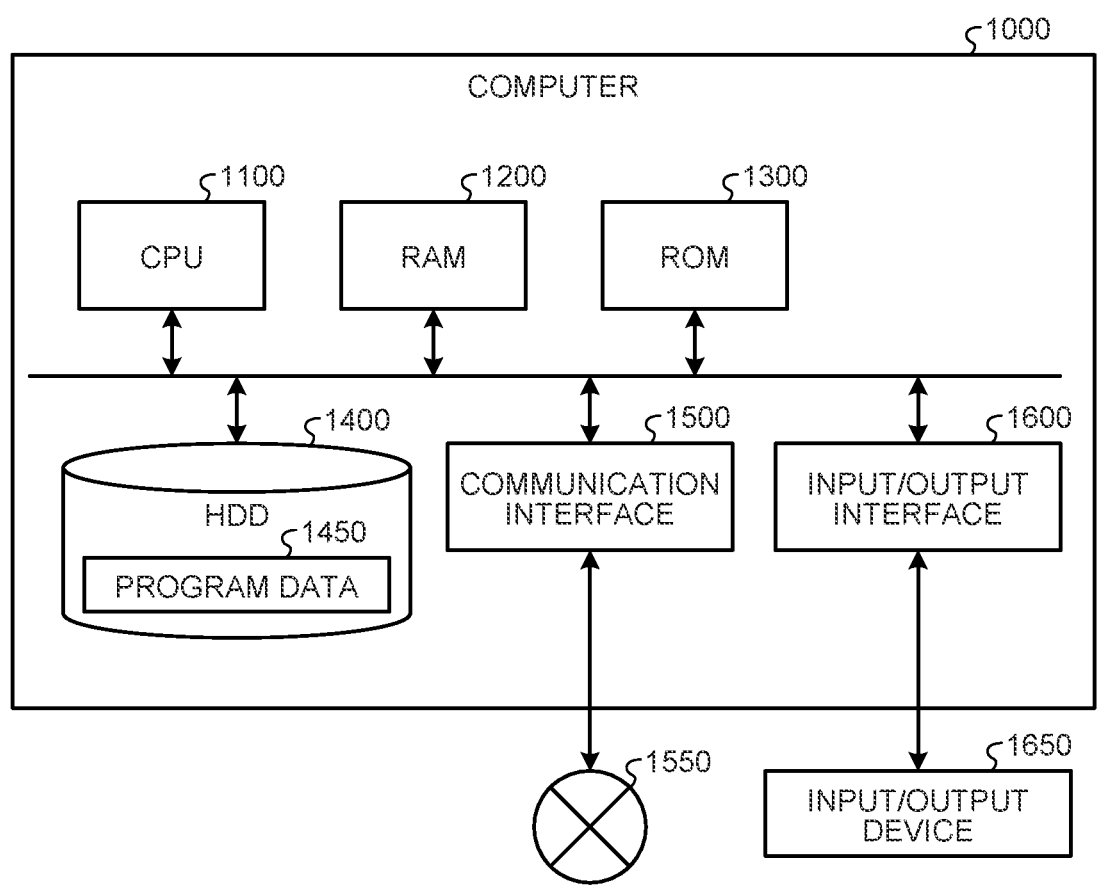
FIG. 27 is a hardware configuration diagram illustrating an example of a computer that implements a function of a server.

The information processing device such as the server 300 according to each embodiment described above is implemented by a computer 1000 having a configuration as illustrated in FIG. 27, for example. Hereinafter, an example of the server 300 according to the embodiment of the present disclosure will be described. FIG. 27 is a hardware configuration diagram illustrating an example of the computer 1000 that implements the function of the server 300. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input/output device 1650 such as a keyboard, a mouse, and a microphone via an input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording media. Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the server 300 according to the embodiment of the present disclosure, the CPU 1100 of the computer 1000 executes a program stored in the RAM 1200 and thereby implements the functions of the processing unit 310 or the like. In addition, the HDD 1400 stores an information processing program according to the present disclosure, and the like. While the CPU 1100 executes program data 1450 read from the HDD 1400, the CPU 1100 may acquire these programs from another device via the external network 1550, as another example.

Furthermore, the information processing device according to the present embodiment may be applied to a system including a plurality of devices on the premise of connection to a network (or inter-device communication), such as cloud computing. That is, the information processing device according to the present embodiment described above can be implemented as the information processing system according to the present embodiment by a plurality of devices, for example.

An example of a hardware configuration of the server 300 and the like has been described above. Each of the above-described components may be constituted by using a general-purpose member, or may be constituted by hardware specialized for the function of each of the components. Such a configuration can be appropriately modified according to the technical level at the time of implementation.

6. SUPPLEMENTARY NOTES

The embodiment of the present disclosure described above can include, for example, a program for causing a computer to function as the information processing device according to the present embodiment, and a non-transitory tangible medium on which the program is recorded. In addition, the program may be distributed via a communication line (including wireless communication) such as the Internet.

Furthermore, each step in the processing of each embodiment described above does not necessarily have to be processed in the described order. For example, the individual steps may be processed in an appropriately changed order. In addition, each step may be partially processed in parallel or individually instead of being processed in time series. Furthermore, the processing method of each step may not necessarily be processed according to the described method, and may be processed by another method by another functional unit, for example.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Note that the present technique can also have the following configurations.

(1) An information processing device comprising:
   a data acquisition unit that acquires sensing data of a real object;
   a parameter acquisition unit that acquires a predetermined parameter; and
   an object generation unit that extracts a feature amount from the sensing data and generates a virtual object based on the feature amount,
   wherein the object generation unit adjusts the virtual object according to the predetermined parameter.

(2) The information processing device according to (1), wherein the parameter acquisition unit acquires at least one of a position parameter, a time parameter, an attribute information parameter, or an environmental parameter, regarding the real object, the virtual object, or a user, as the predetermined parameter.

(3) The information processing device according to (1) or (2),
   wherein the object generation unit includes:
   an encoding unit that extracts the feature amount from the sensing data and convolves the feature amount into a latent variable having a predetermined dimension;
   an adjustment unit that adjusts the latent variable based on the predetermined parameter; and
   a decoding unit that generates the virtual object based on the adjusted latent variable.

(4) The information processing device according to (3), wherein the adjustment unit changes the latent variable by a change amount determined based on the predetermined parameter.

(5) The information processing device according to (4), wherein the object generation unit handles the latent variable as a variable that follows a predetermined probability distribution.

(6) The information processing device according to (5),
   wherein the object generation unit further includes
   a category acquisition unit that acquires a category of the real object, and
   the category acquisition unit inputs the acquired category as a condition to the encoding unit and the decoding unit.

(7) The information processing device according to (6), wherein the encoding unit and the decoding unit are neural networks that have been trained to learn, by machine learning in advance, images of a plurality of other real objects in a same category as a category to which the real object belongs and other virtual objects corresponding to the plurality of other real objects.

(8) The information processing device according to any one of (1) to (7), wherein the data acquisition unit acquires the sensing data from an imaging device or a depth sensor.

(9) The information processing device according to any one of (1) to (8), wherein the real object is a person.

(10) The information processing device according to (9), wherein the virtual object is an avatar.

(11) The information processing device according to (10), wherein the real object is an article.

(12) The information processing device according to (11), wherein the virtual object is an icon.

(13) The information processing device according to (12), further comprising a management unit that manages the icon in association with a user who owns or rents the real object.

(14) The information processing device according to (13), wherein the management unit manages the icon in association with the avatar based on the user.

(15) The information processing device according to any one of (1) to (14), further comprising an output unit that outputs the virtual object.

(16) The information processing device according to (15), wherein the output unit causes a display device to display the virtual object in a virtual space.

(17) The information processing device according to (15), wherein the output unit causes a display device to display the virtual object so as to be superimposed onto a real space image.

(18) The information processing device according to (15), wherein the output unit causes a display device to display the virtual object so as to be superimposed onto a real space.

(19) An information processing method, by an information processing device, comprising:
   acquiring sensing data of a real object;
   acquiring a predetermined parameter; and
   extracting a feature amount from the sensing data, and generating a virtual object based on the feature amount,
   wherein the virtual object is adjusted in accordance with the predetermined parameter at the time of generation of the virtual object.

(20) A program causing a computer to implement:
   a function of acquiring sensing data of a real object;
   a function of acquiring a predetermined parameter; and
   a function of extracting a feature amount from the sensing data and generating a virtual object based on the feature amount,
   wherein the virtual object is adjusted according to the predetermined parameter at the time of generation of the virtual object.

(21) An information processing device including:
   a data acquisition unit that acquires an image of a product;
   a parameter acquisition unit that acquires a parameter of the product; and
   an object generation unit that extracts a feature amount from the image and generates an icon based on the feature amount,
   in which the object generation unit adjusts the icon according to the parameter.

(22) The information processing device according to (21), in which the parameter of the product is quality of the product.

(23) The information processing device according to (21) or (22), in which the product is a second-hand product in secondary distribution.

REFERENCE SIGNS LIST

10 INFORMATION PROCESSING SYSTEM
100, 100a, 100b, 100c USER TERMINAL

102 SENSOR UNIT
104 INPUT UNIT
106 DISPLAY UNIT
110 CONTROL UNIT
112, 410 COMMUNICATION UNIT
300, 300a SERVER
310, 310a PROCESSING UNIT
320 SENSING DATA ACQUISITION UNIT
330 PARAMETER ACQUISITION UNIT
340 OBJECT GENERATION UNIT
342 ENCODING UNIT
344 DECODING UNIT
346 ADJUSTMENT UNIT
348 CATEGORY ACQUISITION UNIT
350 OUTPUT UNIT
360 MANAGEMENT UNIT
370 AUTHENTICATION UNIT
380 RECOMMENDATION UNIT
390 SETTLEMENT UNIT
400, 400a STORAGE UNIT
402 PERSONAL INFORMATION DB
404 PRODUCT INFORMATION DB
500 COMMUNICATION NETWORK
700 VIRTUAL SPACE
800 USER
810 ARTICLE (PRODUCT)
900 AVATAR
910 ICON

The invention claimed is:

1. An information processing device, comprising:
a Central Processing Unit (CPU) configured to:
   acquire sensing data of a first real object;
   acquire a specific parameter;
   extract a feature amount from the sensing data;
   convolve the feature amount into a latent variable having a specific dimension;
   adjust the latent variable based on the specific parameter; and
   generate a first virtual object based on the adjusted latent variable.

2. The information processing device according to claim 1, wherein
the specific parameter includes at least one of a position parameter, a time parameter, an attribute information parameter, or an environmental parameter, and
the specific parameter is associated with at least one of the first real object, the first virtual object, or a user.

3. The information processing device according to claim 1, wherein the CPU is further configured to:
determine a change amount based on the specific parameter; and
change the latent variable by the determined change amount.

4. The information processing device according to claim 3, wherein the CPU is further configured to handle the latent variable as a variable that follows a specific probability distribution.

5. The information processing device according to claim 4, wherein the CPU is further configured to acquire a category of the first real object.

6. The information processing device according to claim 5, wherein the CPU is further configured to train neural networks images of a plurality of second real objects in a same category as the category of the first real object, and second virtual object corresponding to the plurality of second real objects.

7. The information processing device according to claim 1, wherein the CPU is further configured to acquire the sensing data from one of an imaging device or a depth sensor.

8. The information processing device according to claim 1, wherein the first real object is a person.

9. The information processing device according to claim 1, wherein the first virtual object is an avatar.

10. The information processing device according to claim 9, wherein the first real object is an article.

11. The information processing device according to claim 10, wherein the first virtual object is an icon.

12. The information processing device according to claim 11, wherein the CPU is further configured to manage the icon in association with a user who one of owns or rents the first real object.

13. The information processing device according to claim 12, wherein the CPU is further configured to manage the icon in association with the avatar.

14. The information processing device according to claim 1, wherein the CPU is further configured to control output of the first virtual object.

15. The information processing device according to claim 14, wherein the CPU is further configured to control a display device to display the first virtual object in a virtual space.

16. The information processing device according to claim 14, wherein the CPU is further configured to control a display device to display the first virtual object that is superimposed onto a real space image.

17. The information processing device according to claim 14, wherein the CPU is further configured to control a display device to display the first virtual object that is superimposed onto a real space.

18. An information processing method, comprising:
in an information processing device:
   acquiring sensing data of a real object;
   acquiring a specific parameter;
   extracting a feature amount from the sensing data;
   convolving the feature amount into a latent variable having a specific dimension;
   adjusting the latent variable based on the specific parameter; and
   generating a virtual object based on the adjusted latent variable.

19. A non-transitory computer-readable medium having stored thereon computer-executable instructions which, when executed by a computer, cause the computer to execute operations, the operations comprising:
acquiring sensing data of a real object;
acquiring a specific parameter;
extracting a feature amount from the sensing data;
convolving the feature amount into a latent variable having a specific dimension;
adjusting the latent variable based on the specific parameter; and
generating a virtual object based on the adjusted latent variable.

* * * * *